United States Patent
Jackson et al.

(10) Patent No.: US 12,413,880 B2
(45) Date of Patent: *Sep. 9, 2025

(54) WEARABLE INTERACTIVE AUDIO DEVICE

(71) Applicant: Apple Inc., Cupertino, CA (US)

(72) Inventors: Benjamin G. Jackson, Belmont, CA (US); Brenton A. Baugh, Los Altos Hills, CA (US); David H. Bloom, San Francisco, CA (US); Gemma A. Roper, San Francisco, CA (US); Karlin Y. Bark, Menlo Park, CA (US); Thomas S. Hulbert, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,433

(22) Filed: Jul. 5, 2023

(65) Prior Publication Data
US 2023/0345155 A1 Oct. 26, 2023

Related U.S. Application Data

(63) Continuation of application No. 16/927,367, filed on Jul. 13, 2020, now Pat. No. 11,743,623, which is a
(Continued)

(51) Int. Cl.
*H04R 1/02* (2006.01)
*G06F 3/01* (2006.01)
(Continued)

(52) U.S. Cl.
CPC ............ *H04R 1/02* (2013.01); *G06F 3/016* (2013.01); *G06F 3/017* (2013.01); *G06F 3/165* (2013.01); *H04R 1/1016* (2013.01); *H04R 3/007* (2013.01)

(58) Field of Classification Search
CPC .... H04R 1/02; H04R 1/1016; H04R 2225/61; H04R 3/007
See application file for complete search history.

(56) References Cited

U.S. PATENT DOCUMENTS

| | | | |
|---|---|---|---|
| 1,276,708 A | 8/1918 | Blair | |
| 1,646,628 A | 10/1927 | Nolen | |

(Continued)

FOREIGN PATENT DOCUMENTS

| | | | |
|---|---|---|---|
| CN | 2831113 | 10/2006 | |
| CN | 204104134 | 1/2015 | |

(Continued)

OTHER PUBLICATIONS

Baechtle et al., "Adjustable Audio Indicator," IBM, 2 pages, Jul. 1, 1984.

(Continued)

*Primary Examiner* — Suhan Ni
(74) *Attorney, Agent, or Firm* — Brownstein Hyatt Farber Schreck, LLP

(57) ABSTRACT

Embodiments are directed to a wearable audio device, such as an earbud. The earbud may be configured to detect input using various sensors and structures. For example, the earbud may be configured to detect gestures, physical manipulations, and so forth performed along or on the earbud. In response to the detected inputs, the earbud may be configured to change various outputs, such as an audio output or a haptic output of the device. The earbud may also include a microphone to register voice commands. In some cases, the microphone may be used to control the earbud using the registered voice command in response to one or more detected gestures or physical manipulations.

20 Claims, 19 Drawing Sheets

Related U.S. Application Data continuation of application No. 16/055,071, filed on Aug. 4, 2018, now Pat. No. 10,757,491.

(60) Provisional application No. 62/683,594, filed on Jun. 11, 2018.

(51) Int. Cl.
*G06F 3/16* (2006.01)
*H04R 1/10* (2006.01)
*H04R 3/00* (2006.01)

(56) References Cited

U.S. PATENT DOCUMENTS

| | | |
|---|---|---|
| 1,893,291 A | 1/1933 | Kwartin |
| 1,992,605 A | 2/1935 | Clifford et al. |
| 2,325,688 A | 7/1943 | Landis |
| 2,779,095 A | 1/1957 | Hottenroth, Jr. |
| 3,414,689 A | 12/1968 | Gummel et al. |
| 3,866,299 A | 2/1975 | Gregg et al. |
| 4,068,103 A | 1/1978 | King et al. |
| 4,081,631 A | 3/1978 | Feder |
| 4,089,576 A | 5/1978 | Barchet |
| 4,095,411 A | 6/1978 | Kondo |
| 4,132,437 A | 1/1979 | Green |
| 4,245,642 A | 1/1981 | Skubitz et al. |
| 4,352,168 A | 9/1982 | Anderson et al. |
| 4,466,441 A | 8/1984 | Skubitz et al. |
| 4,658,425 A | 4/1987 | Julstrom |
| 5,106,318 A | 4/1992 | Endo et al. |
| 5,293,002 A | 3/1994 | Grenet et al. |
| 5,335,011 A | 8/1994 | Addeo et al. |
| 5,341,433 A | 8/1994 | Meyer et al. |
| 5,406,038 A | 4/1995 | Reiff et al. |
| 5,521,886 A | 5/1996 | Hirosawa et al. |
| 5,570,324 A | 10/1996 | Geil |
| 5,604,329 A | 2/1997 | Kressner et al. |
| 5,619,583 A | 4/1997 | Page et al. |
| 5,733,153 A | 3/1998 | Takahashi et al. |
| 5,879,598 A | 3/1999 | McGrane |
| 5,958,203 A | 9/1999 | Parce et al. |
| 5,960,366 A | 9/1999 | Duwaer |
| 6,036,554 A | 3/2000 | Koeda et al. |
| 6,073,033 A | 6/2000 | Campo |
| 6,129,582 A | 10/2000 | Wilhite et al. |
| 6,151,401 A | 11/2000 | Annaratone |
| 6,154,551 A | 11/2000 | Frenkel |
| 6,191,796 B1 | 2/2001 | Tarr |
| 6,192,253 B1 | 2/2001 | Charlier et al. |
| 6,317,237 B1 | 11/2001 | Nakao et al. |
| 6,370,005 B1 | 4/2002 | Sun et al. |
| 6,373,958 B1 | 4/2002 | Enomoto et al. |
| 6,385,134 B1 | 5/2002 | Lange et al. |
| 6,400,825 B1 | 6/2002 | Miyamoto et al. |
| 6,516,077 B1 | 2/2003 | Yamaguchi et al. |
| 6,553,126 B2 | 4/2003 | Han et al. |
| 6,700,987 B2 | 3/2004 | Kuze et al. |
| 6,754,359 B1 | 6/2004 | Svean et al. |
| 6,813,218 B1 | 11/2004 | Antonelli et al. |
| 6,829,018 B2 | 12/2004 | Lin et al. |
| 6,882,335 B2 | 4/2005 | Saarinen |
| 6,892,850 B2 | 5/2005 | Suzuki et al. |
| 6,924,792 B1 | 8/2005 | Jessop |
| 6,934,394 B1 | 8/2005 | Anderson |
| 6,942,771 B1 | 9/2005 | Kayyem |
| 7,003,099 B1 | 2/2006 | Zhang et al. |
| 7,059,932 B1 | 6/2006 | Tobias et al. |
| 7,082,322 B2 | 7/2006 | Harano |
| 7,116,795 B2 | 10/2006 | Tuason et al. |
| 7,154,526 B2 | 12/2006 | Foote et al. |
| 7,158,647 B2 | 1/2007 | Azima et al. |
| 7,181,030 B2 | 2/2007 | Rasmussen et al. |
| 7,263,373 B2 | 8/2007 | Mattisson |
| 7,266,189 B1 | 9/2007 | Day |
| 7,362,877 B2 | 4/2008 | Honda et al. |
| 7,378,963 B1 | 5/2008 | Begault et al. |
| 7,414,922 B2 | 8/2008 | Ferri et al. |
| 7,527,523 B2 | 5/2009 | Yohn et al. |
| 7,536,029 B2 | 5/2009 | Choi et al. |
| 7,570,772 B2 | 8/2009 | Sorensen et al. |
| 7,679,923 B2 | 3/2010 | Inagaki et al. |
| 7,792,320 B2 | 9/2010 | Proni |
| 7,867,001 B2 | 1/2011 | Ambo et al. |
| 7,878,869 B2 | 2/2011 | Murano et al. |
| 7,903,061 B2 | 3/2011 | Zhang et al. |
| 7,912,242 B2 | 3/2011 | Hikichi |
| 7,966,785 B2 | 6/2011 | Zadesky et al. |
| 8,031,853 B2 | 10/2011 | Bathurst et al. |
| 8,055,003 B2 | 11/2011 | Mittleman et al. |
| 8,116,505 B2 | 2/2012 | Kawasaki-Hedges et al. |
| 8,116,506 B2 | 2/2012 | Kuroda et al. |
| 8,161,890 B2 | 4/2012 | Wang |
| 8,204,266 B2 | 6/2012 | Munoz et al. |
| 8,218,397 B2 | 7/2012 | Chan |
| 8,226,446 B2 | 7/2012 | Kondo et al. |
| 8,264,777 B2 | 9/2012 | Skipor et al. |
| 8,286,319 B2 | 10/2012 | Stolle et al. |
| 8,331,603 B2 | 12/2012 | Martenson et al. |
| 8,340,312 B2 | 12/2012 | Johnson et al. |
| 8,409,417 B2 | 4/2013 | Wu |
| 8,417,298 B2 | 4/2013 | Mittleman et al. |
| 8,447,054 B2 | 5/2013 | Bharatan et al. |
| 8,452,037 B2 | 5/2013 | Filson et al. |
| 8,488,817 B2 | 7/2013 | Mittleman et al. |
| 8,508,908 B2 | 8/2013 | Jewell-Larsen |
| 8,560,309 B2 | 10/2013 | Pance et al. |
| 8,574,004 B1 | 11/2013 | Tarchinski et al. |
| 8,620,162 B2 | 12/2013 | Mittleman |
| 8,632,670 B2 | 1/2014 | Garimella et al. |
| 8,644,519 B2 | 2/2014 | Pance et al. |
| 8,644,533 B2 | 2/2014 | Burns |
| 8,693,698 B2 | 4/2014 | Carnes et al. |
| 8,724,841 B2 | 5/2014 | Bright et al. |
| 8,804,993 B2 | 8/2014 | Shukla et al. |
| 8,811,648 B2 | 8/2014 | Pance et al. |
| 8,858,271 B2 | 10/2014 | Yeung et al. |
| 8,879,761 B2 | 11/2014 | Johnson et al. |
| 8,882,547 B2 | 11/2014 | Asakuma et al. |
| 8,885,851 B2 | 11/2014 | Westenbroek et al. |
| 8,983,097 B2 | 3/2015 | Dehe et al. |
| 8,989,428 B2 | 3/2015 | Kwong |
| 9,007,871 B2 | 4/2015 | Armstrong-Muntner |
| 9,042,588 B2 | 5/2015 | Aase |
| 9,066,172 B2 | 6/2015 | Dix et al. |
| 9,118,990 B2 | 8/2015 | Hankey et al. |
| 9,161,434 B2 | 10/2015 | Merz et al. |
| 9,182,859 B2 | 11/2015 | Coulson et al. |
| 9,227,189 B2 | 1/2016 | Sobek et al. |
| 9,229,494 B2 | 1/2016 | Rayner |
| 9,357,299 B2 | 5/2016 | Kwong |
| 9,380,369 B2 | 6/2016 | Utterman et al. |
| 9,386,362 B2 | 7/2016 | Filson et al. |
| 9,451,354 B2 | 9/2016 | Zadesky et al. |
| 9,486,823 B2 | 11/2016 | Andersen et al. |
| 9,497,527 B2 | 11/2016 | Mittleman et al. |
| 9,774,941 B2 | 9/2017 | Grinker |
| 9,820,033 B2 | 11/2017 | Dix et al. |
| 9,838,811 B2 | 12/2017 | Pelosi |
| 9,854,345 B2 | 12/2017 | Briggs |
| 9,857,262 B2 | 1/2018 | Kil et al. |
| 9,888,309 B2 | 2/2018 | Prelogar et al. |
| 9,900,698 B2 | 2/2018 | Luzzato et al. |
| 9,955,244 B2 | 4/2018 | Rothkopf et al. |
| 10,063,951 B2 | 8/2018 | Filson et al. |
| 10,117,012 B2 | 10/2018 | Saulsbury et al. |
| 10,165,694 B1 | 12/2018 | Werner et al. |
| 10,455,311 B2 | 10/2019 | Magariyachi et al. |
| 10,466,047 B2 | 11/2019 | Ehman |
| 10,466,961 B2 | 11/2019 | Yang |
| 10,477,328 B2 | 11/2019 | Han et al. |
| 10,684,656 B2 | 6/2020 | MacNeil et al. |
| 10,757,491 B1 | 8/2020 | Jackson et al. |
| 10,837,772 B2 | 11/2020 | MacNeil et al. |
| 10,873,798 B1 | 12/2020 | Jackson et al. |

(56) References Cited

U.S. PATENT DOCUMENTS

| | | |
|---|---|---|
| 11,307,661 B2 | 4/2022 | Miller et al. |
| 11,334,032 B2 | 5/2022 | Liang et al. |
| 11,561,144 B1 | 1/2023 | Han et al. |
| 2003/0087292 A1 | 5/2003 | Chen et al. |
| 2004/0203520 A1 | 10/2004 | Schirtzinger et al. |
| 2005/0009004 A1 | 1/2005 | Xu et al. |
| 2005/0271216 A1 | 12/2005 | Lashkari |
| 2006/0072248 A1 | 4/2006 | Watanabe et al. |
| 2006/0233411 A1 | 10/2006 | Utigard |
| 2007/0012827 A1 | 1/2007 | Fu et al. |
| 2007/0191719 A1 | 8/2007 | Yamashita et al. |
| 2008/0037771 A1 | 2/2008 | Black et al. |
| 2008/0204379 A1 | 8/2008 | Perez-Noguera |
| 2008/0260188 A1 | 10/2008 | Kim |
| 2008/0292112 A1 | 11/2008 | Valenzuela et al. |
| 2008/0292126 A1 | 11/2008 | Sacha et al. |
| 2008/0310663 A1 | 12/2008 | Shirasaka et al. |
| 2009/0045005 A1 | 2/2009 | Byon et al. |
| 2011/0002487 A1 | 1/2011 | Panther et al. |
| 2011/0211724 A1 | 9/2011 | Hirata |
| 2011/0219882 A1 | 9/2011 | Nakamura |
| 2011/0261951 A1 | 10/2011 | Holmes et al. |
| 2012/0052924 A1 | 3/2012 | Cybart et al. |
| 2013/0141364 A1 | 6/2013 | Lynn et al. |
| 2013/0164999 A1 | 6/2013 | Ge et al. |
| 2013/0280965 A1 | 10/2013 | Kojyo |
| 2013/0322646 A1 | 12/2013 | Davie et al. |
| 2014/0022189 A1 | 1/2014 | Sheng et al. |
| 2014/0143784 A1 | 5/2014 | Mistry et al. |
| 2014/0250657 A1 | 9/2014 | Stanley et al. |
| 2015/0002452 A1 | 1/2015 | Klinghult et al. |
| 2015/0023510 A1 | 1/2015 | Shimizu |
| 2015/0078611 A1 | 3/2015 | Boozer et al. |
| 2016/0004311 A1 | 1/2016 | Yliaho et al. |
| 2016/0055729 A1 | 2/2016 | Maddox et al. |
| 2016/0150311 A1 | 5/2016 | Bremyer et al. |
| 2016/0324478 A1 | 11/2016 | Goldstein |
| 2017/0035156 A1 | 2/2017 | Wright et al. |
| 2017/0094386 A1 | 3/2017 | Trainer et al. |
| 2017/0169673 A1 | 6/2017 | Billington et al. |
| 2017/0180850 A1 | 6/2017 | Hsu et al. |
| 2017/0303048 A1 | 10/2017 | Hooton et al. |
| 2017/0347179 A1 | 11/2017 | Masaki et al. |
| 2018/0063981 A1 | 3/2018 | Park et al. |
| 2019/0037293 A1 | 1/2019 | Kim |
| 2020/0075272 A1 | 3/2020 | Solis et al. |
| 2020/0100013 A1 | 3/2020 | Harjee et al. |
| 2020/0107110 A1 | 4/2020 | Ji et al. |
| 2020/0266845 A1 | 8/2020 | Kumar et al. |
| 2020/0344536 A1 | 10/2020 | Jackson et al. |
| 2022/0214751 A1 | 7/2022 | Miller et al. |
| 2022/0269221 A1 | 8/2022 | Liang et al. |
| 2022/0286539 A1 | 9/2022 | Stobbe et al. |
| 2023/0350349 A1 | 11/2023 | Liang et al. |

FOREIGN PATENT DOCUMENTS

| | | |
|---|---|---|
| CN | 016415411 | 2/2017 |
| CN | 107677538 | 2/2018 |
| DE | 3009624 | 3/1980 |
| EP | 2094032 | 8/2009 |
| GB | 2310559 | 8/1997 |
| GB | 2342802 | 4/2000 |
| JP | S566190 | 1/1981 |
| JP | 2102905 | 4/1990 |
| JP | 2003319490 | 11/2003 |
| JP | 2004153018 | 5/2004 |
| JP | 2006297828 | 11/2006 |
| JP | 2016095190 | 5/2016 |
| JP | 2018050141 | 3/2018 |
| KR | 20100105004 | 9/2010 |
| KR | 20190107490 | 9/2019 |
| KR | 20200026000 | 3/2020 |
| WO | WO03/049494 | 6/2003 |
| WO | WO04/025938 | 3/2004 |
| WO | WO2007/083894 | 7/2007 |
| WO | WO08/153639 | 12/2008 |
| WO | WO2009/017280 | 2/2009 |
| WO | WO2011/057346 | 5/2011 |
| WO | WO2011/061483 | 5/2011 |
| WO | WO2016/190957 | 12/2016 |
| WO | WO2018/135849 | 7/2018 |

OTHER PUBLICATIONS

Blankenbach et al., "Bistable Electrowetting Displays," https://spie.org/x43687.xml, 3 pages, Jan. 3, 2011.

Enns, Neil, "Touchpad-Based Remote Control Devices," University of Toronto, 1998.

Min-Soo, Kim, "Apple iphone 12 'notch' disappearing . . . New Face ID Test," https://nocutnews.co.kr/news/5232116, 5 pages, Oct. 23, 2019.

Pingali et al., "Audio-Visual Tracking for Natural Interactivity," Bell Laboratories, Lucent Technologies, pp. 373-382, Oct. 1999.

Valdes et al., "How Smart Watches Work," https://electronics.howstuffworks.com/gadgets/clocks-watches/smart-watch2.htm, 10 pages, Apr. 2005.

Zhou et al., "Electrostatic Graphene Loudspeaker," Applied Physics Letters, vol. 102, No. 223109, 5 pages, Dec. 6, 2012.

WEARABLE INTERACTIVE AUDIO DEVICE

CROSS-REFERENCE TO RELATED APPLICATION

This application is a continuation patent application of U.S. patent application Ser. No. 16/927,367, filed Jul. 13, 2020 and titled "Wearable Interactive Audio Device," which is a continuation patent application of U.S. patent application Ser. No. 16/055,071, filed Aug. 4, 2018 and titled "Wearable Interactive Audio Device," now U.S. Pat. No. 10,757,491, which is a nonprovisional patent application of and claims the benefit of U.S. Provisional Patent Application No. 62/683,594, filed Jun. 11, 2018 and titled "Wearable Interactive Audio Device," the disclosures of which are hereby incorporated herein by reference in their entireties.

FIELD

Embodiments relate generally to wearable audio devices. More particularly, embodiments relate to sensors and structures that facilitate detection of input at a wearable audio device.

BACKGROUND

An earbud is worn at least partially inside of the ear of a user and typically is configured to produce a range of sounds based on a signal from another device. Many traditional earbuds suffer from significant drawbacks that may limit the ability to control sounds, or other outputs, at the earbud. In many cases, the earbud requires a hardwired connection that physically couples the earbud to another device and the sound is controlled based on input received at the device. Further, earbuds and/or other connected devices may be unresponsive to voice commands, thereby limiting the adaptability of the earbud to control multiple types of functions.

SUMMARY

Embodiments of the present invention are directed to a wearable interactive audio device.

In a first aspect, the present disclosure includes a wearable audio device. The wearable audio device includes an enclosure defining an opening. The wearable audio device further includes a sealing component connected to the enclosure and configured to define a sealed passage from the opening to an ear of a user. The wearable audio device further includes a speaker acoustically coupled to the sealed passage. The wearable audio device further includes a sensor positioned within the enclosure and configured to detect: (i) a direction of a first gesture input; and (ii) a direction of a second gesture input. The wearable audio device further includes a processing unit operatively coupled to the sensor and the speaker, the processing unit configured to, in response to the sensor detecting the direction of the first gesture input, cause the speaker to output a first audio signal. The processing unit may be further configured to, in response to the sensor detecting the direction of the second gesture input, cause the speaker to output a second audio signal.

In a second aspect, the present disclosure includes a wearable audio device. The wearable audio device includes an enclosure defining an earbud body. The wearable audio device further includes a sealing component connected to the enclosure and having a conformable surface. The wearable audio device further includes a tactile structure positioned on an exterior of the enclosure. The wearable audio device further includes a sensor positioned within the enclosure and configured to detect: (i) a first manipulation of the tactile structure; and (ii) a second manipulation of the tactile structure. The wearable audio device further includes a speaker configured to provide an audio output through the sealing component. The speaker may be configured to change the audio output in response to each of: (i) the first manipulation; and (ii) the second manipulation.

In a third aspect, the present disclosure includes a wearable audio device. The wearable audio device includes an enclosure defining an exterior surface of the wearable audio device and an opening. The wearable audio device further includes a sealing component positioned around the opening and configured to couple an interior volume of the enclosure with a user's ear canal. The wearable audio device further includes a first sensor positioned within the enclosure and configured to detect a gesture along the exterior surface. The wearable audio device further includes a second sensor positioned within the enclosure and configured to detect an audio input. The wearable audio device further includes a processing unit operatively coupled with the first sensor and the second sensor and configured to control a function of the wearable audio device using the audio input based on a detection of the gesture input.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like elements.

Figure 1A:
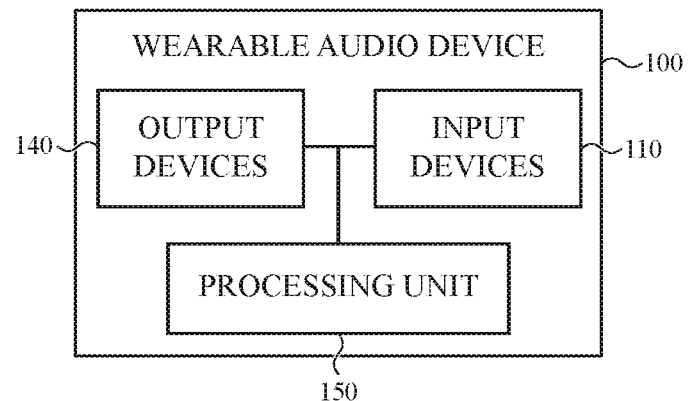
FIG. 1A depicts a functional block diagram of a wearable audio device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The present disclosure describes systems, devices, and techniques related to a wearable audio device, such as an earbud or other device that may be worn at least partially in an ear of a user. The wearable audio device may form a sealed passage with an ear canal of the user when worn. A speaker of the wearable audio device may provide audio output through the sealed passage. The audio output may include music, voice communications, instructions, sounds, alerts, and so forth. The audio output may be initiated or controlled by a processing unit of the wearable audio device and/or an associated companion device, as described herein. The audio output may be responsive to various types of input received at the device, including touch and gesture inputs and physical manipulations of controls or other tactile structures.

The audio output may also be responsive to audio input, such as voice commands, received at the wearable audio device. The processing unit may distinguish between the various types of input in order to control one or more functions of the wearable audio device. For example, voice commands may be used to control music playback (e.g., play, pause, volume up/down), answer or end a call, interact with an intelligent digital assistant, and so forth. In some cases, voice commands may be used to control the device in response to detecting another type of input, such as a touch or a gesture. This may allow the wearable audio device to operate in various modes, including a first mode in which audio input is temporarily ignored, and a second mode in which identified voice commands are used to control the device.

To facilitate the foregoing, the wearable audio device may include one or more sensors that detect different types of input. Broadly, the sensors may include substantially any input device, sensor, sensing element, sensing structure, switch, or the like, or combination thereof, that is responsive to environmental changes around the wearable audio device. As one example, an incorporated sensor may detect a touch or proximity of a user or object to the wearable audio device. Continuing the example, a capacitive sensor may be incorporated into an enclosure of the wearable audio device and used to detect a capacitance between an electrode of the sensor and the user. As the user moves toward (and optionally presses on) the enclosure, the capacitance changes. This change (or absolute value of the capacitance) may be used to determine a position of a user's finger relative to the enclosure.

Likewise, an array of capacitive sensors may be operatively coupled to one another and used to track movement of the user along the enclosure. This may allow the wearable audio device to detect multiple gestures on or along the enclosure (e.g., a first gesture input, a second gesture input, and so on). For example, the sensor may detect a first direction of a gesture input and a second direction of a gesture input along the enclosure (or other directions, motions, and so on the gesture input). The processing unit of the wearable audio device may, in turn, initiate one or more functions of the wearable audio device based on the detected input, such as increasing a playback volume in response to the first direction of motion and/or decreasing playback volume in response to the second direction of motion, among other possible functions.

It will be appreciated that various types of sensors may be used to detect a touch, gesture, or the like at the enclosure and are described in greater detail below. For example, one or more optical sensors may be positioned within the enclosure and may detect a location of a user's hand, finger, or other object. An optical coating (transparent only to certain wavelengths) may substantially conceal the optical sensor from a user by camouflaging a lens and/or protective window of the sensor with the surrounding enclosure. Magnetic sensors, strain sensors, resistive sensors, and electroactive polymers (EAPs) may be used to detect such input at the wearable audio device, as described in greater detail below.

Additionally or alternatively, one or more tactile structures may be incorporated within or along an exterior of the enclosure and detect input at the wearable audio device. Broadly, a tactile structure may be substantially any physical feature of the device enclosure, including a button, switch, or other control, that may be physically manipulated by a user. Possible structures include textured surfaces of the enclosure, multi-input domes, rotary wheels and/or crowns, deformable stems, and so on. In some cases, the tactile structure may be configured to provide haptic feedback to the user in response to such manipulation, which may indicate receipt of input by the wearable audio device. Haptic feedback may be provided in part by forming the tactile structure from domes, beams, or other deformable materials and/or coupling the tactile structure with various electrically or thermally actuated haptic structures, as described herein.

Various sensors may be configured to detect manipulation of the tactile structure (e.g., a first manipulation, a second manipulation) and provide a corresponding signal that may be used to control, for example, the audio output and/or other global functions of the wearable audio device. For example, the sensors may detect a squeeze, a rotation, a swipe, a press, a jog, and so on of the tactile structure. To illustrate, where the tactile structure is a wheel, the sensors may detect a first rotation of the wheel and a second rotation of the wheel (or other physical manipulation), and the audio output may be responsive to each of the detected rotations. As another example, when the tactile structure is a textured surface of the enclosure, the sensor may detect a first swipe of the textured surface and a second swipe of the textured surface (or other manipulation), and the audio output may be responsive to each of the detected swipes. In this manner, the tactile structure may be used to indicate a boundary or region of the enclosure that may be touch-sensitive. For example, a user may tactilely perceive a change in surface texture between a surrounding device enclosure and the tactile structure, which signifies a region of the device that receives touch input. This may allow the user to accurately perform a gesture or other input on the enclosure while the wearable audio device is worn in the ear, or while the user is otherwise not visually perceiving the enclosure. In other cases, other tactile structures may be used and are described in greater detail herein, including embodiments in which multiple different tactile structures and/or combination of tactile structures and sensors are used to detect physical manipulations and/or gestures inputs at the enclosure.

For example, in an embodiment, the sensors may include one or more microphones positioned at least partially within the enclosure of the wearable audio device. As stated above, one microphone may detect voice commands that are used by the on-board processing unit to control, for example, the audio output of a speaker. This microphone may also be operatively coupled to another sensor (via the processing unit) so that such voice commands are accepted in conjunction or succession with another input, such as a touch input in a particular location on the device. Another microphone may detect other types of input, including input received by a body (e.g., head) of a user. For example, the microphone may detect an acoustic signal associated with a tap of a user's hand on a portion of the user's head, a click of a user's teeth, and/or other body movement that may be associated with input. This may allow the user to control audio output or another function of the device without necessarily physically contacting the wearable audio device and/or any associated companion device, thereby improving the adaptability of the system. This may also increase the interaction area that may receive input and reduce acoustic impacts of tapping the wearable audio device, among other improvements. Other microphones may be used and are described in greater detail below, including various beam forming and other microphones that may be used to detect and filter ambient noise.

The wearable audio device may include various structural components that house the sensors and tactile structures described herein. The enclosure of the wearable audio device may generally define an earbud body, which is shaped or otherwise contoured to be at least partially received within an ear of a user. The enclosure may have an interior volume that houses the sensors, speakers, microphones, processing unit(s), and other components and define an opening that allows the audio output from the speaker to exit. A sealing component, such as an elastic or deformable ring, may be positioned around the opening and configured to form a sealed passage between the interior volume and an ear canal of the user. To facilitate the forgoing, the sealing component may have a conformable surface that contacts the user's outer ear and engages, for example, the concha, the antihelix, the helix, or the like, in order to form the seal.

The enclosure may also have, or be formed from, various structural components that facilitate detection of input and/or receipt of the device within a user's ear. For example, in an embodiment, the enclosure may include a main unit and a stem. The main unit may define the opening through which audio output is provided to the user. The stem may extend from the main unit and include additional sensors, including touch sensors, and beam-forming microphones. The stem may generally be an elongated structure and, in some cases, house an antenna or other communications device. Both the main unit and the stem may be configured to receive a touch or gesture input and/or physical manipulation, as described herein. As a non-limiting illustration, the main unit may define a substantially uninterrupted external surface that may be used to receive a swipe of various directions or other gestures. As another illustration, the stem may be squeezed, rotated, or otherwise physically manipulated in order to provide input. It will be appreciated, however, that the main unit and the stem are presented herein for purposes of discussion, and that the enclosure of the wearable audio device may take substantially any shape to facilitate the various functions described herein.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1A depicts a functional block diagram of a wearable audio device 100, such as the wearable audio device discussed above and described in greater detail below. The wearable audio device 100 includes one or more input devices 110, one or more output devices 140, and a processing unit 150. Broadly, the input devices 110 detect various types of input, and the output devices 140 provide various types of output. The processing unit 150 receives input signals from the input devices 110 in response to inputs detected at the input devices. The processing unit 150 may interpret input signals received from one or more input devices 110 and send output signals to one or more output devices 140 that instruct the output devices 140 to provide output. Detected input at one or more input devices 110 may be used to control one or more functions of the wearable audio device 100. In this regard, the output devices 140 may be configured to provide outputs that may be manipulated based on the input detected at the input devices 110. The outputs provided by the output devices 140 may also be responsive to, or initiated by, a program or application executed by a processing unit of the wearable audio device 100 and/or an associated companion device.

In various embodiments, the input devices 110 may include any suitable components for detecting inputs. Examples of input devices 110 include audio sensors (e.g., microphones), optical or visual sensors (e.g., cameras, visible light sensors, invisible light sensors), proximity sensors, touch sensors, force sensors, mechanical devices (e.g., switches, buttons, keys), vibration sensors, orientation sensors, motion sensors (e.g., accelerometers, velocity sensors), location sensors (e.g., GPS devices), thermal sensors, communication devices (e.g., wired or wireless communication devices), resistive sensors, magnetic sensors, electroactive polymers (EAPs), strain gauges, and so on, or some combination thereof. Each input device 110 may be configured to detect one or more particular types of input and provide a signal (e.g., an input signal) corresponding to the detected input, for example to the processing unit 150.

The output devices 140 may include any suitable components for providing outputs. Examples of output devices 140 include audio output devices (e.g., speakers), visual output devices (e.g., lights, displays), tactile output devices (e.g., haptic output devices), communication devices (e.g., wired or wireless communication devices), or some combination thereof. Each output device 140 may be configured to receive one or more signals (e.g., an output signal), for example from the processing unit 150, and provide an output corresponding to the signal.

The processing unit 150 is operably coupled to the input devices 110 and the output devices 140. The processing unit 150 is adapted to exchange signals with the input devices 110 and the output devices 140. For example, the processing unit 150 may receive an input signal from an input device 110 that corresponds to an input detected by the input device. The processing unit 150 may interpret the received signal to determine whether to provide and/or change one or more outputs in response the input. The processing unit 150 may then send an output signal to one or more output devices 140 to provide and/or change outputs as appropriate. The processing unit 150 may include one or more computer processors or microcontrollers that are configured to perform operations in response to computer-readable instructions. Examples of suitable processing units are discussed in more detail below with respect to FIG. 16.

As discussed above, in some embodiments, the input devices 110 include one or more microphones used to detect audio input. The audio input may include voice commands, vibrations, bodily noises, ambient noise, or other acoustic signals. In some cases, the wearable audio device 100 may have one or more dedicated microphones that are configured to detect particular types of audio input. For example, the wearable audio device 100 may include a first microphone, such as a beamforming microphone, that is configured to detect voice commands from a user, a second microphone that is configured to detect ambient noise, and a third microphone that is configured to detect acoustic signals or vibrations from a user's body (such as that produced by a facial tap or other gesture).

The processing unit 150 may receive a signal from each microphone and distinguish between the various types of input. For example, the processing unit 150 may identify a signal from the microphone(s) associated with an input (e.g., a voice command, a facial tap, and so on) and initiate a signal that is used to control a corresponding function of the wearable audio device 100, such as an output provided by an output device 140. The processing unit 150 may also identify signals from the microphone(s) associated with an ambient condition and ignore the signal and/or use the signal to control an audio output of the wearable audio device 100 (e.g., a speaker), such as acoustically cancelling or mitigating the effects of ambient noise.

One or more input devices 110 may operate to detect a location of an object or body part of a user relative to the wearable audio device 100. This may also include detecting gestures, patterns of motion, signs, finger or hand positions, or the like, including detecting a direction of the input, such as a direction of a gesture along an x-axis, a y-axis, and/or a z-axis. To facilitate the foregoing, the wearable audio device 100 may include a capacitive sensor that is configured to detect a change in capacitance between an electrode of the sensor and a user. As the user approaches the sensor, the capacitance changes, and thus may be used to determine a distance of the user relative to the electrode. In this manner, multiple capacitive sensors may be used to track a location or position of a body part of the user along an exterior surface of the wearable audio device 100.

In some cases, the capacitive sensor may also be used to measure or detect a force input on an exterior surface of the wearable audio device 100. For example, the user may press the exterior surface and deform it toward the electrode of the sensor. The surface may deform by a known amount for a given force, and thus a force applied by the user to the surface may be determined based on the positioned of the user derived from the change in capacitance.

As discussed above, the wearable audio device 100 may also include one or more visual or optical sensors. The optical sensors may, in certain embodiments, measure an intensity of light at one or more locations on the exterior surface of the wearable audio device 100. A decrease in the intensity of light at a particular location may be associated with a user input or gestures, such as a cupping gesture over the wearable audio device 100. A lens or protective window of the optical sensor may be camouflaged from a surrounding surface of the wearable audio device 100, for example, using an optical coating, which may match the surrounding surface but be translucent to certain wavelengths of light. In other embodiments, the optical sensor may be, or form a component of, a camera or camera system. This may allow the wearable audio device 100 to detect and recognize specific types of gestures using pattern recognition.

Optical sensors, in certain embodiments, may also be used to detect a location of the wearable audio device 100. For example, an optical sensor may be positioned relative to a portion of the wearable audio device 100 configured to be worn in a user's ear. This may allow the optical sensor to detect a receipt of the wearable audio device 100 within a person ear (e.g., in response to a decrease in light intensity measured at the sensor).

The input devices 110 may also include one or more mechanical devices or tactile structures that are configured to receive physical input or manipulations. Physical manipulations may include a squeeze, a collapse, a roll or rotation, a jog, a press, a pull, and so on. In some cases, the physical input may manipulate the mechanical device or tactile structure and cause the mechanical device or tactile structure to physically complete a switch or circuit that triggers a switch event. In other cases, the physical manipulation of the tactile structure is detected or recognized by substantially non-contact types of sensors or switches of the wearable audio device 100, such as an optical reader detecting the rotation of a wheel, and so on. The mechanical device or tactile structure may therefore take various forms, including a textured exterior surface, a multi-input button or dome, a wheel, a crown, and so on.

The wearable audio device 100 may include various other components and sensors that are configured to detect input. In one embodiment, the wearable audio device 100 may include an antenna that is configured to communicatively or wirelessly couple the wearable audio device 100 to another device, such as the companion device 170 described below with respect to FIG. 1B. Accordingly, the wearable audio device 100 may be configured to receive input signals from other devices such as the companion device 170. As described above, the inputs may be used to control one or more outputs of the wearable audio device 100, such as an audio output.

As a further example, the input devices 110 may include a thermal sensor to detect the placement of the wearable audio device 100 within a user's ear. Accelerometers and speed sensors may be used to detect changing conditions, for example, when the wearable audio device 100 is used or otherwise worn by a user driving an automobile. In other cases, other combinations of sensors and associated functionalities are possible and contemplated herein.

As described above, an input device 110 may initiate or provide a signal corresponding to an input detected at the input device. The signal may be provided to the processing unit 150 and used to control one or more outputs of the wearable audio device 100. In this regard, the wearable audio device 100 may include various output devices 140 in order to provide outputs and alter or manipulate the outputs based on detected inputs.

The output devices 140 may include one or more audio output devices, such as speakers, configured to produce an audio output, such as various types of music, voice communications, instructions, sounds, alerts, other acoustic signals, or some combination thereof. In some embodiments, the speakers have a relatively small form factor corresponding to that of the wearable audio device 100 so that the speakers may be disposed within an enclosure of the wearable audio device 100. For example, the speaker may generally have a maximum dimension within a range of several millimeters, however other dimensions are possible. Notwithstanding, the speaker may be configured to provide substantially high resolution audio output to a user. This may be facilitated by the various components (e.g., sealing component 322 of FIG. 3A) described herein that are used define a sealed passage between an interior volume of the wearable audio device 100 (which houses the speaker) and the user's ear canal. The speaker may also be tuned to operate in one or more modes that facilitate canceling or mitigating ambient noise detected by, for example, one or more of the microphones of the wearable audio device 100. For example, various characteristics of the audio output may be altered, for example by the processing unit 150, in order to compensate for the interference of the ambient noise.

Audio outputs may be configured to change in response to inputs received at the wearable audio device 100. For example, the processing unit 150 may be configured to change the audio output provided by a speaker in response to an input corresponding to a gesture input, physical manipulation, voice command, and so on. The speaker may thus receive multiple distinct signals from the processing unit 150 corresponding to different types of input or otherwise corresponding to distinct functions. To illustrate, a first signal corresponding to a direction of a first gesture input may cause the processing unit 150 to alter the audio output in a first manner (e.g., such as increasing playback volume in response to an up swipe), and a second signal corresponding to a direction of a second gesture input may cause the processing unit 150 to alter the audio output in a second manner (e.g., such as decreasing playback volume in response to a down swipe), among other possibilities.

The output devices 140 may include one or more tactile output devices configured to produce a tactile or haptic output. Haptic outputs may be facilitated by a haptic feedback structure, such as a dome, electromechanical actuator, and so forth. The output devices 140 may include one or more tactile structures to provide a tactile indication of, for example, the receipt of input by the wearable audio device 100. This may include a buckling of a collapsible dome, or other deformation of a structure that registers input in response to a physical manipulation. Additionally or alternatively, a tactile structure may visually and/or tactilely indicate a region of the wearable audio device 100 operable to receive input. For example, a textured surface may provide a tactile output to a user as the user feels the changing contours of the surface.

The output devices 140 may include one or more visual output devices configured to illuminate or otherwise visually alter a portion of the wearable audio device 100, such as an exterior surface. Various lights or visual indicators may be used to produce a visual output of the wearable audio device 100. The visual output may be indicative of an operational status of the wearable audio device 100. For example, the visual output may include certain colors that represent a power-on mode, a standby mode, a companion-device pairing mode, a maintenance mode, and so on.

Visual output may also be used to indicate a receipt of input by the wearable audio device 100. As one possibility, visual indicators along a surface of the wearable audio device 100 may produce a momentary flash, change colors, and so on, in response to received inputs. In this regard, the visual output may be responsive or adaptable to the various different types of input detected or that otherwise correspond to distinct functions of the wearable audio device 100. This may include producing a first visual output (e.g., a first color, animation, or sequence) in response to a first input (audio, gesture, mechanical, and so forth) and producing a second visual output (e.g., second color, animation, or sequence) in response to a second input (audio, gesture, mechanical, and so forth).

Additional or alternative output devices 140 may generally be configured to produce other types of output, including, but not limited to, thermal outputs, pressure outputs, outputs for communication to external or companion devices, and so on. In one embodiment, the wearable audio device 100 may include an antenna that is configured to communicatively or wirelessly couple the wearable audio device 100 to another device, such as the companion device 170 described below with respect to FIG. 1B. The wearable audio device 100 may thus transmit an output signal from the to the companion device 170 that may be used to control one or more outputs of the companion device 170, such as an audio output.

The input devices 110 and the output devices 140 described with respect to FIG. 1A may include a collection of mechanical components, sensors, instruments, processing unit(s), computer-readable instructions, and so forth that collectively operate to perform the functions described herein. Rather than define discrete or isolated systems, it will be appreciated that the devices may use common or overlapping components to perform the described functions. Further, in addition to those described with respect to FIG. 1A, the wearable audio device 100 may include any other appropriate hardware (e.g., sensors, switches, antennas, processing units, memories), software (e.g., applications, system programs, engines), network components (e.g., communication paths, interfaces, routers), and so forth for use in facilitating any operations disclosed herein, for example, such as those described below with respect to FIG. 16.

Figure 1B:
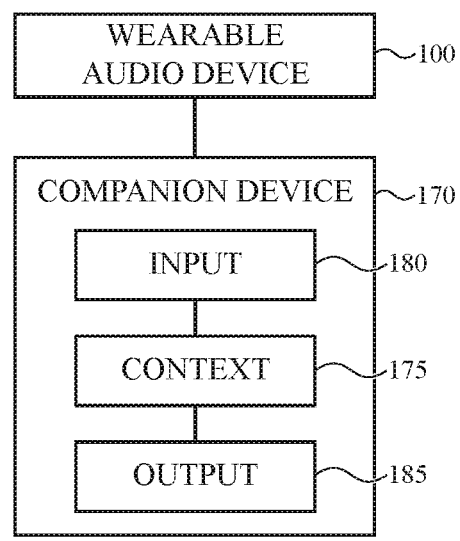
FIG. 1B depicts a functional block diagram of a wearable audio device and a companion device.

FIG. 1B depicts a functional block diagram of a wearable audio device (such as the device of FIG. 1A) and a companion device 170. In particular, the wearable audio device 100, described above with respect to FIG. 1A, is shown communicatively coupled with a companion device 170. The companion device 170 may be substantially any computing device that is configured to receive input and initiate a signal that is used to control the wearable audio device 100. In some embodiments, the functionality of the companion device 170 is provided by the wearable audio device 100. Sample companion devices include, but are not limited to, a personal computer, a notebook computer, a tablet, a smart phone, a watch, a case for the wearable audio device 100, a home automation device, and so on. Example companion devices, and corresponding structures are described herein, for example, with respect to FIGS. 12-16.

The wearable audio device 100 and the companion device 170 may be communicatively coupled via a wireless connection. For example, the wearable audio device 100 may be paired with the companion device 170 using a short range wireless interconnection; however, other wireless connection techniques and protocols may be used. In other embodiments, the wearable audio device 100 and the companion device 170 may be connected via a wired connection.

FIG. 1B depicts various functional modules of the companion device 170. Each functional module or submodule described with respect to FIG. 1B may include a collection of mechanical components, sensors, instruments, processing unit(s), computer-readable instructions, and so forth that collectively operate to perform the functions described herein. It will be appreciated that the companion device 170 also may include any appropriate hardware, software, network components, and so forth for use in facilitating any operations disclosed herein, for example, such as those described below with respect to FIG. 16.

For purposes of illustration, the companion device 170 includes at least a context module 175, an input module 180, and an output module 185. Broadly, the context module 175 may be configured to provide an operational context to the wearable audio device 100. An operational context may be, or include, information associated with an application or program executed on the companion device 170 (e.g., such as an application executed by the processing unit 1608 of FIG. 16). The operational context may therefore be used by the wearable audio device 100 to provide an output, such as a music output (where the executed program is an audio file), a voice communication output (where the executed program is a telephone call), an audio notification output (where the executed program is a navigation application), among various other possibilities.

The operational context may also be used by the wearable audio device 100 to determine or activate a particular type of input or sensor. For example, different types of gestures, audio input, physical manipulations, and so forth may be registered as input (or ignored) based on the operational context. To illustrate, where the operational context causes the wearable audio device 100 to output music, the processing unit 150 may be configured to control the music based on a direction of motion of a received input (e.g., such as a swipe in a first direction, a second direction, and so on). In another mode, where the operational context causes the wearable audio device 100 to output voice communications, the processing unit 150 may be configured to control the music based on a physical manipulation of a tactile structure (and ignore gesture inputs), among various other possibilities.

With reference to the input module 180, the companion device 170 may be configured to receive input using various different sensors and structures. For example, and as described in greater detail below with respect to the sample companion devices of FIGS. 12-16, the companion device 170 may include mechanical buttons, keyboards, touch-sensitive surfaces, trackpads, microphones, and other sensors. The input detected by the input module 180 may be used to control an output of the wearable audio device 100. As one example, an audio playback volume may be increased or decreased in response to a manipulation of one or more mechanical keys or buttons of the companion device 170. The input detected by the input module 180 may also be used to control a mode of the wearable audio device 100, such as a mode for detecting certain audio inputs. For example, the wearable audio device 100 may be configured to enter a mode in which audio input is used to control a function of the wearable audio device 100 and/or the companion device 170.

With reference to the output module 185, the companion device 170 may be configured to provide output using various different components and structures. For example, and as described in greater detail below with respect to the sample companion devices of FIGS. 11-16, the companion device 170 may include speakers, a display, tactile structures, and other components. The output provided by the output module 185 may be responsive to input detected by the wearable audio device 100. As one example, in response to a detection of input at the wearable audio device 100, a graphic may be depicted at a display of the companion device 170, or, likewise, a sound may be produced at a speaker of the companion device 170. The output module 185, more generally, may also be used to indicate a status of the wearable audio device 100 to a user. For example, the output module 185 may produce an output, visual or otherwise, corresponding to different modes of the wearable audio device 100, including a power-on mode, a standby mode, a battery status level, among various other indications.

Figure 2:
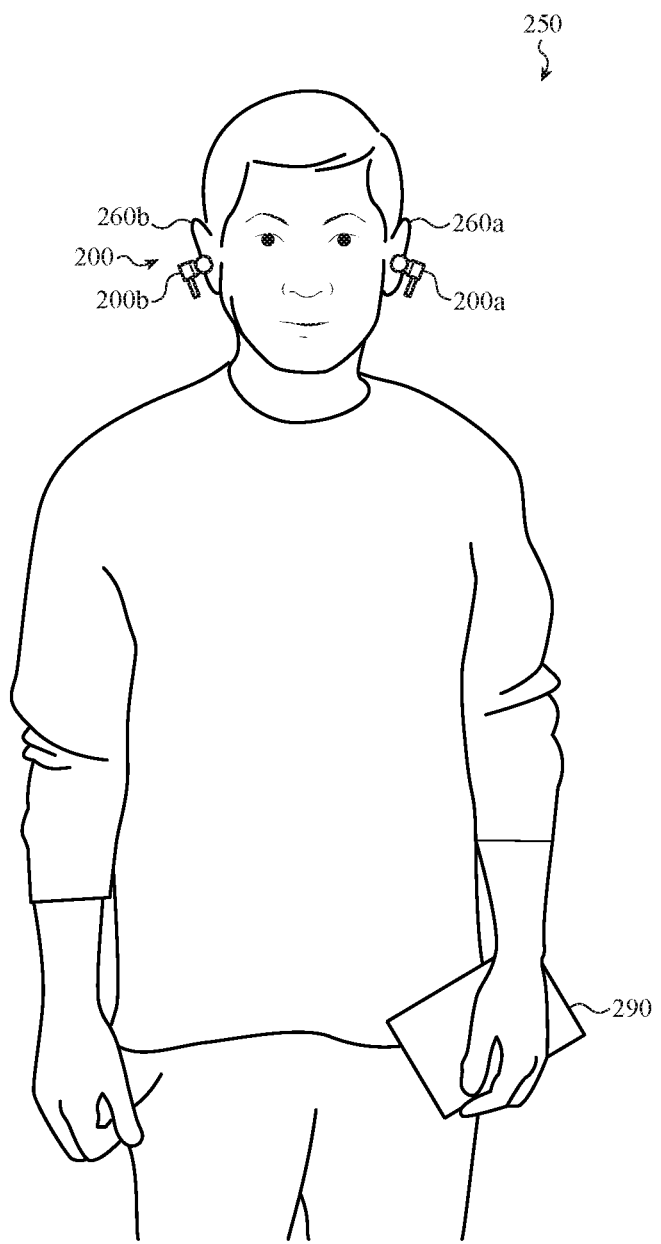
FIG. 2 depicts sample wearable audio devices worn by a user.

FIG. 2 depicts wearable audio devices 200 worn by a user 250. The wearable audio devices 200 may be a pair of devices, such as a first wearable audio device 200a and a second wearable audio device 200b, shown in FIG. 2. Each of the first wearable audio device 200a and the second wearable audio device 200b may be substantially analogous to the wearable audio device 100 described above with respect to FIGS. 1A and 1B. For example, the wearable audio devices 200 may each be configured to detect input (e.g., audio, gesture, physical manipulation, and so on) and alter an audio or other output based on the detected input. In this regard, it will be appreciated that the wearable audio device 200 may include similar components and/or be configured to perform similar functions as the wearable audio device 100 described above. Redundant explanation of these components is omitted here for clarity.

The wearable audio devices 200 may be worn by the user 250, as shown in FIG. 2. In particular, the wearable audio devices 200 may be configured to be received and temporarily secured at an outer ear of the user 205. In some cases, at least a portion of each of the wearable audio devices 200 may engage or seal a portion of a user's ear (such as forming a seal around an ear canal). This may support the device within the ear, and optionally form a sealed passage between various audio output components of the device and an ear canal of the user 250. In the embodiment of FIG. 2, the first wearable audio device 200a may be positioned at least partially within a first ear 260a of the user 250, and the second wearable audio device 200b may be positioned within a second ear 260b of the user 250. While FIG. 2 shows the user 250 wearing both the first wearable audio device 200a and the second wearable audio device 200b, it will be appreciated that in some cases a user 250 may optionally wear a single one of the first wearable audio device 200a or the second wearable audio device 200b. Further, notwithstanding the wearable audio devices 200 being configured to form a sealed passage with an ear canal of the user 250, each of the wearable audio devices 200 may be selectively removable by the user 250, and therefore allow the user 250 to wear and remove the wearable audio devices 200 as needed or desired.

FIG. 2 also shows the user 250 holding a companion device 290. The companion device 290 may be substantially analogous to the companion device 170 described above with respect to FIG. 1B. The companion device 290 may be wirelessly coupled with the wearable audio devices 200. In some cases, the companion device 290 may be configured to transmit information or commands associated with an operational context to one or both of the wearable audio devices 200. This may include information corresponding to an application or program executed on the companion device 290. For example, the companion device 290 may execute a music playback program, and thus the companion device 290 may provide information to the wearable audio devices 200 corresponding to the playback. The wearable audio device 200 may receive the information associated with the operational context and provide an output to the user 250 based on the received information. For example, upon receipt of the music playback information, the wearable audio devices 200 may be configured to provide an audio output to the user 250 that is, or includes, the music playback executed by the companion device 290.

The wearable audio device 200 may also detect input. This may be used to control, for example, a function of the wearable audio device 200 (e.g., as indicated by a manipulation of an output of the device) or a function of the companion device 290. In some cases, each of the wearable audio devices 200 may detect the same type of input and/or otherwise be used to redundantly control the same function. This may be the case, for example, where each of the wearable audio devices 200 is used to control playback volume of an audio output in response to a swipe along an exterior surface of either device. Additionally or alternatively, each of the wearable audio devices 200 may detect different types of input and/or be used to control different functions. This may be the case where, for example, the first wearable audio device 200a is used to control a first function (e.g., play track) in response to an input, and the second audio device 200b is used to control a second function (e.g., stop track) in response to another input. Such controls may be interchangeable, programmable, or otherwise based at least partially on the operational context provided by the companion device 290. Further, while FIG. 2 shows the wearable audio device 200 and the companion device 290, it will be appreciated that the wearable audio device 200 may operate independently from any companion device. For example, and as described herein with respect to FIG. 16, applications, programs, or the like may be executed exclusively on one or both of the first wearable audio device 200a or the second wearable audio device 200b, without necessarily pairing the devices to another external device. The wearable audio device 200 are shown as earbuds in FIG. 2 as one example. In various embodiments, the wearable audio device 200 may take different forms, including as all or part of a headband, lanyard, or other object. In some embodiments, the wearable audio device 200 may be a part of a headset, such as a virtual reality headset.

Figure 3A:
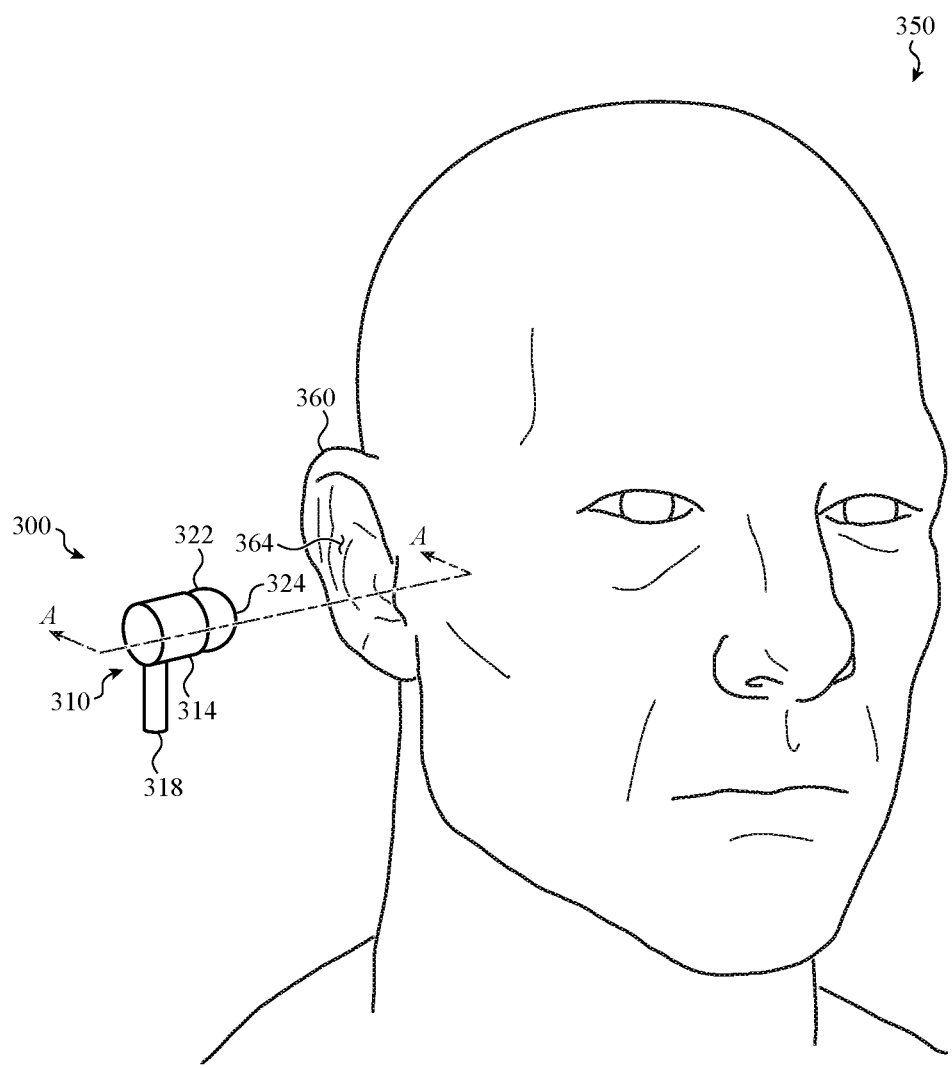
FIG. 3A depicts a sample wearable audio device separated from a user.

FIG. 3A depicts a wearable audio device 300 and a user 350. The wearable audio device 300 is shown in FIG. 3A separated from the user 350. In this regard, rather than being worn, the wearable audio device 300 is shown in FIG. 3 as occupying a position that allows the user 350 to readily advance the wearable audio device 300 toward an ear 360 of the user 350. The ear 360 may generally include an ear surface 364. The wearable audio device 300 may be configured to engage and form a seal with the ear surface 364. This may allow the wearable audio device 300 to provide an audio output directly to the user 350, such as through a sealed passage defined between the audio component of the wearable audio device 300 and the user 350.

To facilitate the foregoing, FIG. 3A shows a sample construction of the wearable audio device 300. In particular, FIG. 3A shows the wearable audio device 300 as including an enclosure 310 and a sealing component 322. The enclosure 310 may define an interior volume containing various sensors, output devices, and other components of the wearable audio device 300. The enclosure 310 may have a form factor that allows the wearable audio device 300 to fit at least partially in the ear 360 of the user 350. While the enclosure 310 may take many forms, in certain embodiments, such as that shown in FIG. 3A, the enclosure 310 may include a main unit 314 and a stem 318. Each of the main unit 314 and the stem 318 may house the input and/or output components of the wearable audio device 300, as appropriate for a given application. In one embodiment, the main unit 314 may house relatively larger components of the wearable audio device 300, such as a speaker or processing unit, and the stem 318 may house components of the wearable audio device 300 that may benefit from the elongated shape of the stem 318, such as various microphones, antennas, and so on.

The enclosure 310 may be connected to the sealing component 322. In some embodiments, the sealing component 322 may be fitted or positioned around a side of the enclosure 310. For example, the enclosure 310 may define a speaker opening and the sealing component 322 may be positioned around this opening. The sealing component 322 may be connected to the enclosure 310 and configured to define a sealed passage from the opening to an ear of a user. As such, the sealing component 322 may be permanently affixed to the enclosure 310. In other cases, as described herein, the sealing component 322 may be connected to the enclosure 310 in a manner that allows the sealing component to be removed, adjusted, replaced, and so on. The use of the term "connected to" embraces both these options.

The sealing component 322 may be configured to engage the ear 360 of the user 350. For example, the sealing component 322 may include a conformable surface 324 that may be pressed into the ear surface 364. In some cases, this may form or define a sealed passage between internal acoustic components of the wearable audio device 300 and, for example, an ear canal of the user 350. Accordingly, the sealing component 322 may be formed from a variety of materials, including elastically deformable materials, such as silicon, rubber, nylon, and various other synthetic or composite materials. As described herein, the sealing component 322 may, in some embodiments, be removable from the enclosure 310 by the user 350. This may allow the user 350 to interchange various different sealing components with the enclosure 310 of the wearable audio device 300 based on user customizable preferences.

Figure 3B:
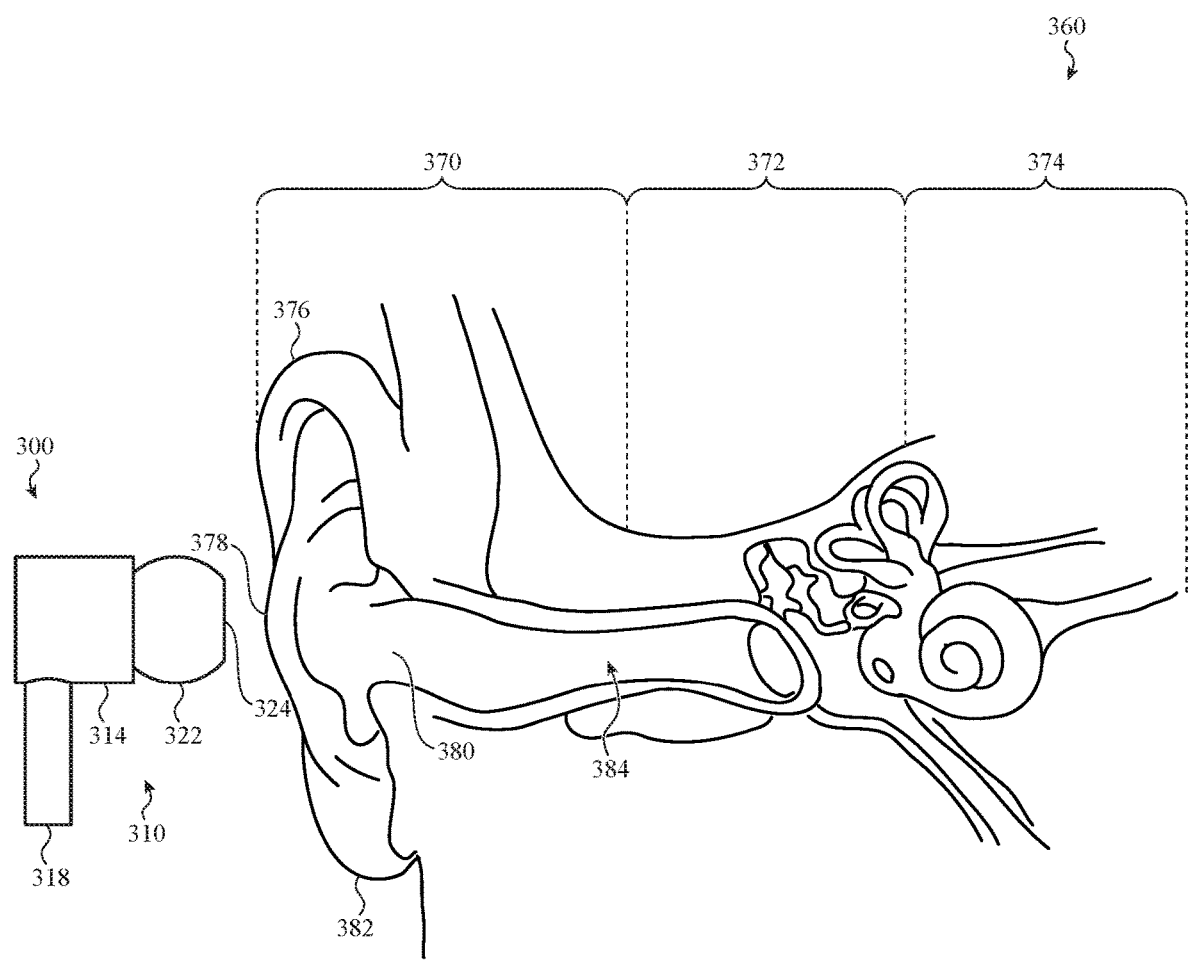
FIG. 3B depicts a cross-sectional view of the sample wearable audio device and the user of FIG. 3A, taken along line A-A of FIG. 3A.

FIG. 3B depicts a cross-sectional view of the ear 360 of the user 350, taken along line A-A of FIG. 3A. Broadly, the ear 360 may include an outer ear region 370, a middle ear region 372, and an inner ear region 374. FIG. 3B shows various features of the ear 360 that may be coupled with the wearable audio device 300 when the wearable audio device 300 is worn by the user 350. For example, features of the outer ear region 370 may include a helix 376, an antihelix 378, a concha 380, an auricular lobule 382, and an ear canal 384, among other features. The ear canal 384 may extend from an external opening of the outer ear region 370, through the middle ear region 372, and towards the inner ear region 374 where acoustic signals from the wearable audio device 300 may be processed by the user 350.

Figure 4A:
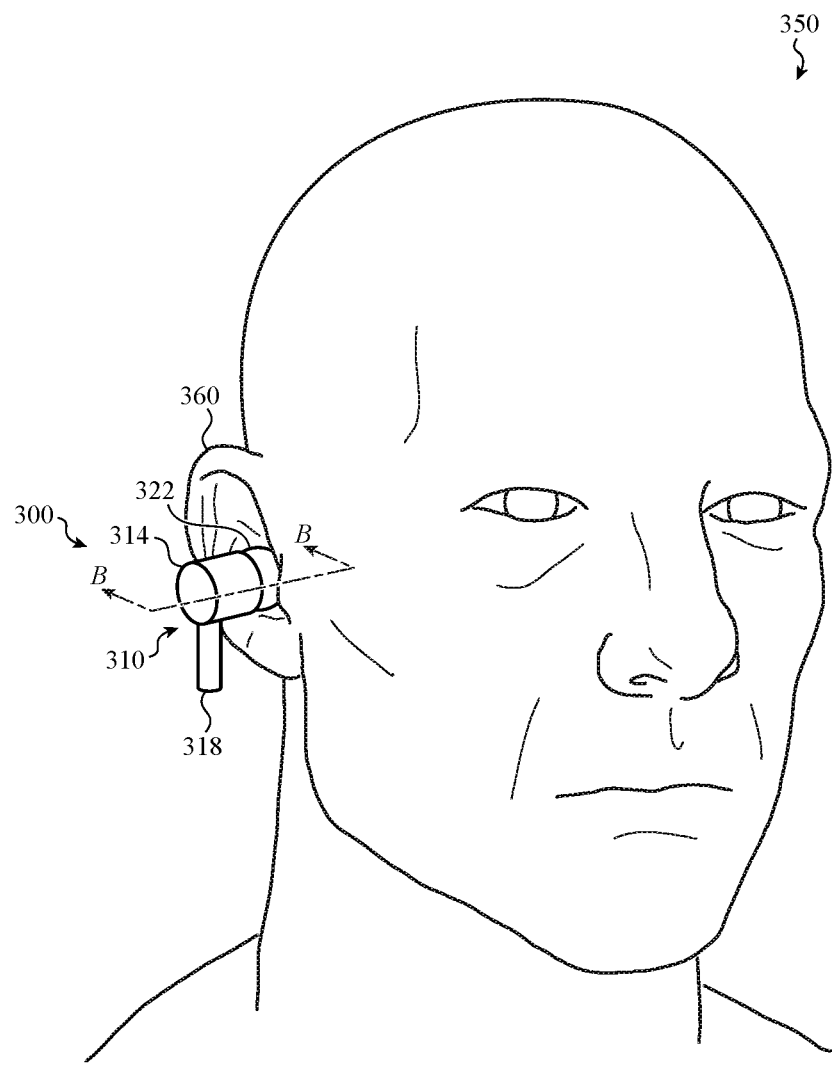
FIG. 4A depicts a sample wearable audio device connected to a user's ear.

FIG. 4A depicts the wearable audio device 300 and the user 350. In particular, FIG. 4A depicts a configuration in which the wearable audio device 300 is worn by the user 350. For example, the wearable audio device 300 may be received at least partially within the ear 360 of the user 350. When the wearable audio device 300 is worn by the user 350, the sealing component 322 may be pressed into the ear 360, thereby causing the conformable surface 324 of the sealing component 322 to contact and conform or partially conform to the ear surface 364. This may allow the sealing component 322 to form a sealed passage between various audio output components of the wearable audio device 300 and, for example, an ear canal of the user.

Figure 4B:
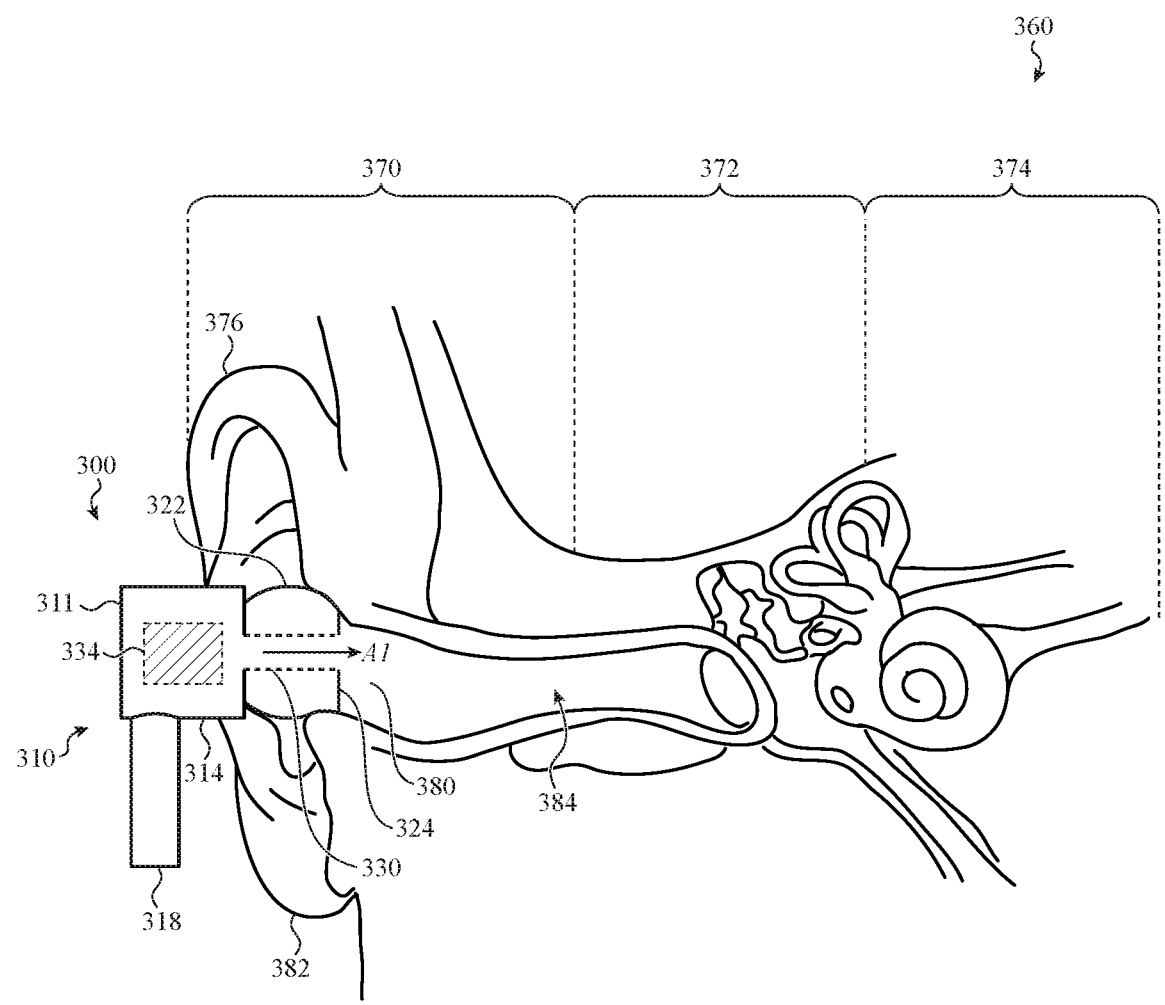
FIG. 4B depicts a cross-sectional view of the sample wearable audio device of the user of FIG. 4A, taken along line B-B of FIG. 4A.

FIG. 4B depicts a cross-sectional view of the ear 360 of the user 350, taken along line B-B of FIG. 4A, and the worn wearable audio device 300. As shown in FIG. 4B, the wearable audio device 300 may be at least partially received with the ear 360. For example, the sealing component 322 may be received within a portion of the outer ear region 370. The sealing component 322 may contact various features of the outer ear region 370 and form a seal about the ear canal 384. For example, the sealing component 322 may contact one or more of the helix 376, the antihelix 378, the concha 380, and/or various other features of the outer ear region 370 that may be positioned about the ear canal 384.

As described herein, the sealing component 322 may form or facilitate a sealed passage between various internal components of the wearable audio device 300 and the ear canal 384 of the user 350. FIG. 4B shows a sealed passage 330. The sealed passage 330 may extend from an interior volume 311 of the enclosure 310 to the ear canal 384. The sealed passage 330 may allow the wearable audio device 300 to propagate audio outputs into the ear canal 384, while mitigating or preventing the audio output from being released into a surrounding environment. For example, FIG. 4B shows a speaker 334 providing an acoustic signal A1 through the sealed passage 330 and into the ear canal 384. This may improve sound quality and also allow the sealing component 322 to block ambient noises or other environmental containments from entering the ear canal 384.

Figure 5:
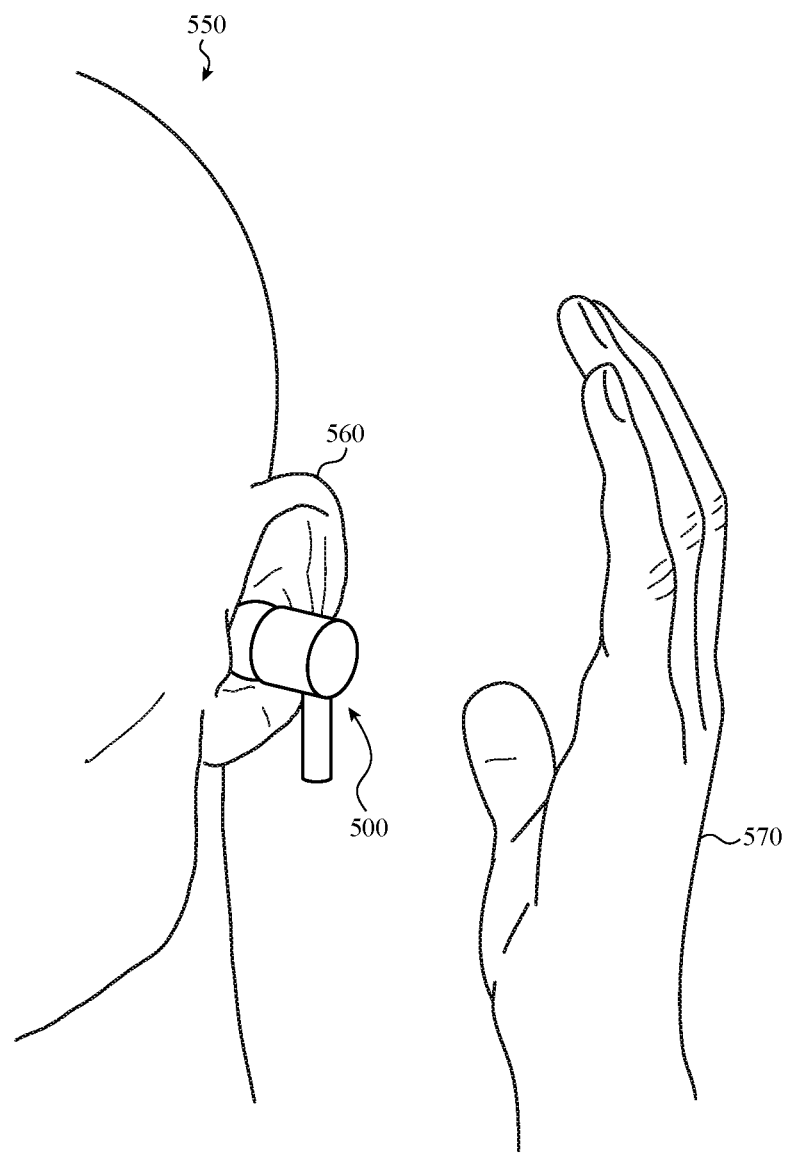
FIG. 5 depicts a sample wearable audio device worn by the user and the user's hand.

FIG. 5 depicts a wearable audio device 500 worn by a user 550. The wearable audio device 500 may be substantially analogous to the wearable audio devices described herein. The wearable audio device 500 may therefore include similar components and/or perform similar functions of other wearable audio devices described herein, redundant explanation of which is omitted here for clarity.

The wearable audio device 500 is shown positioned partially within an ear 560 of the user 550. For example, the wearable audio device 500 may be at least partially received by one or more components of the ear 560 (e.g., such as an ear canal) and include one or more other portions that are positioned outside of the ear 560.

As described in greater detail below with respect to FIGS. 6A-11, the portions of the wearable audio device 500 positioned outside of the ear 560 may facilitate on-device control of the wearable audio device 500. In this regard, FIG. 5 shows a hand 570 proximate to the wearable audio device 500. The hand 570 may form various gestures along the wearable audio device 500 (e.g., a first gesture, a second gesture) which may be detected by one or more input devices of the wearable audio device 500. The gestures may be movements of the hand 570; and as such, the one or more input devices may detect a direction of the gesture input along, for example, an x-axis, a y-axis, and/or a z-axis. The hand 570 may also manipulate one or more structures of the wearable audio device 500 (such as a first or second manipulation of a tactile structure) which may also be detected by one or more input devices of the wearable audio device 500. In either case, the wearable audio device 500 may detect the input from the hand 570, or other object or body portion of the user 550, and control an output of the wearable audio device 500, such as controlling an audio output of a speaker.

Figure 6A:
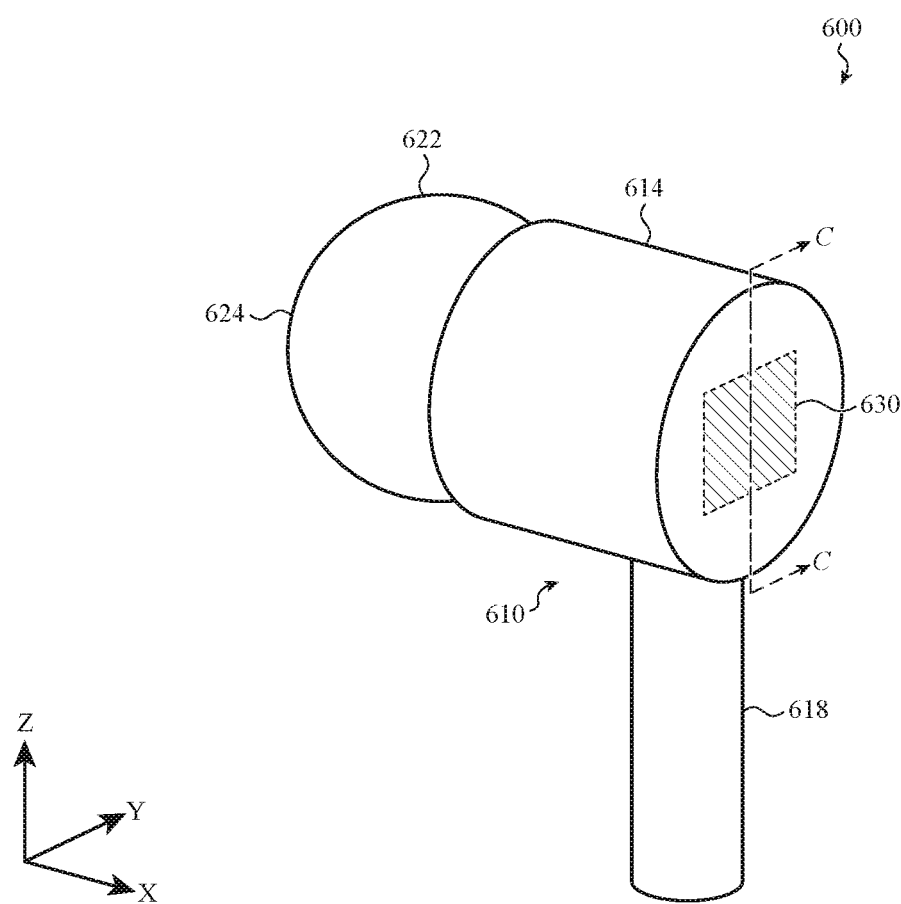
FIG. 6A depicts a sample wearable audio device having an input region.

FIG. 6A depicts a sample wearable audio device 600. The wearable audio device 600 may be substantially analogous to the wearable audio devices described herein. The wearable audio device 600 may therefore include similar components and/or perform similar functions of other wearable audio devices described herein, including an enclosure 610, a main unit 614, a stem 618, a sealing component 622, and a conformable surface 624, redundant explanation of which is omitted here for clarity.

The wearable audio device 600 shown in FIG. 6A includes a touch-sensitive region 630 that may be defined along substantially any exterior surface of the enclosure 610. For purposes of illustration, the touch-sensitive region 630 is defined on the exterior surface of the main unit 614. In other embodiments, the touch-sensitive region 630 may be defined on other portions of the main unit 614 and/or the stem 618 (e.g., as described below with respect to FIG. 8).

The touch-sensitive region 630 may be configured to detect various types of input, including gesture inputs performed along (e.g., on or above) the enclosure 610. For example, the wearable audio device 600 may include one or more sensors (such as any of the input devices 110 of FIG. 1A) that are positioned within, or partially within, the enclosure and configured to detect a direction of a first gesture input, a direction of a second gesture input, and so on performed along the touch-sensitive region 630. A processing unit of the wearable audio device 600 may receive input corresponding to the detected gesture and control one or more functions of the wearable audio device 600 such as an audio output, as described herein.

Figure 6B:
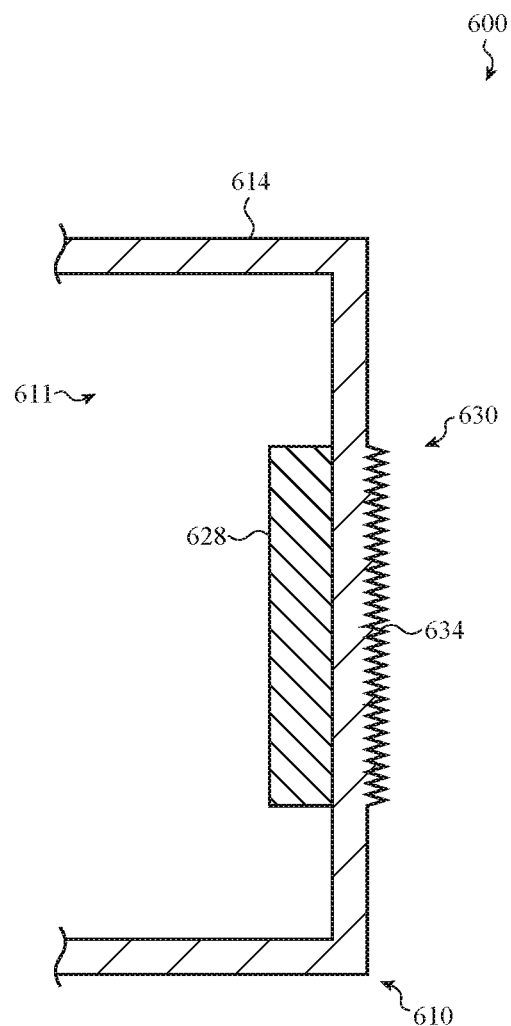
FIG. 6B depicts a cross-sectional view of the sample wearable audio device of FIG. 6A, taken along line C-C of FIG. 6A.

FIG. 6B depicts a cross-sectional view of the enclosure 610, the touch-sensitive region 630, and the sensor 628 of the wearable audio device 600 of FIG. 6A, taken along line C-C of FIG. 6A. As shown in FIG. 6B, the touch-sensitive region 630 may form part of an exterior wall or surface of the main unit 614 of the enclosure 610. Positioned within an interior 611 of the main unit 614 is a sensor 628. The sensor 628 may be substantially any of the sensors described with respect to the input devices 110 of FIG. 1A. For example, the sensor 628 may be capacitive-based and configured to detect a change in capacitance between an electrode and a user and/or other object that approaches the main unit 614 at the touch-sensitive region 630. Other possible sensors include optical sensors, which may detect change in an intensity of light along the input region 630 and/or otherwise detect optical changes (including pattern recognition, such as where the sensor 628 is a camera) that may correspond to input received at the wearable audio device 600.

Figure 9:
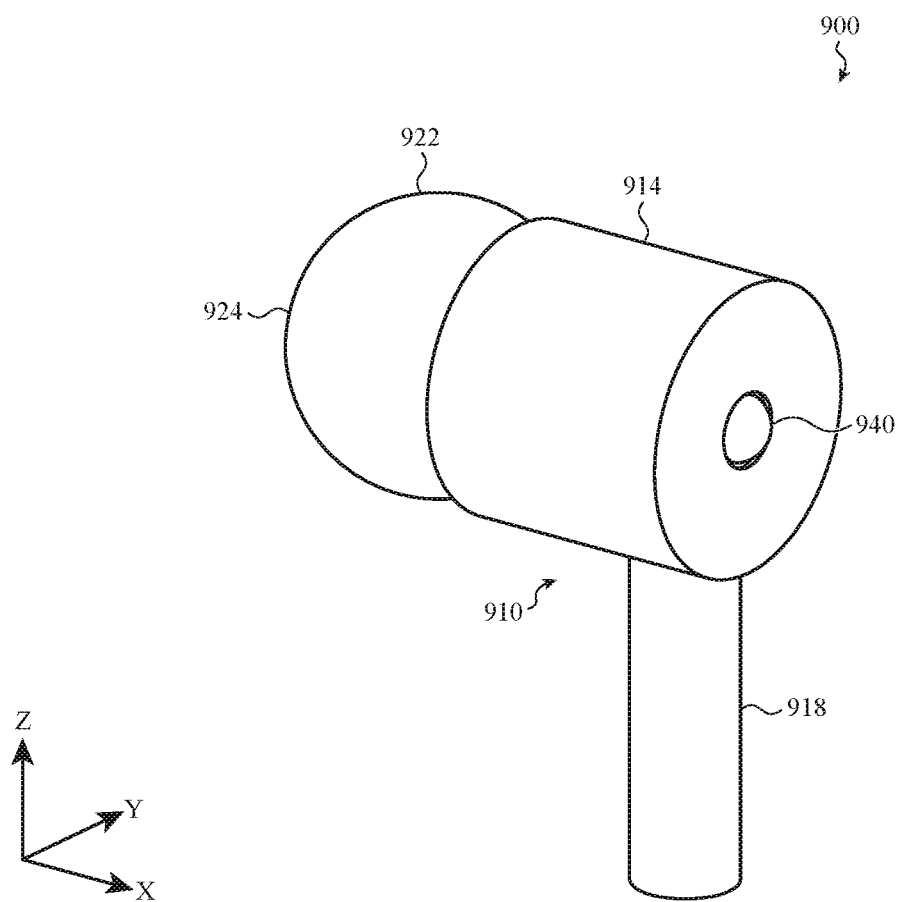
FIG. 9 depicts a sample wearable audio device having a button.

In some embodiments, the sensor 628 may be a substantially non-contact-based sensor. For example, the sensor 628 may be concealed or camouflaged within the main unit 614 and may be actuated based on proximity of a user or object, rather than physical contact with the sensor. In other cases, the sensor 628 may be, or form, a component of a contact-based switch or other mechanism that is actuated by the physical contact from a user. For example, the sensor 628 may be a collapsible dome (as shown in FIG. 9), or other structure that includes electrical contacts that close in response to input or deformation on the enclosure 610.

In the embodiment of FIG. 6B, the enclosure 610 includes a tactile structure 634. The tactile structure 634 may be any series or group of tactile features, ridges, bumps, grooves, discontinuities, and so on that may be tactilely distinguishable from an adjoining smooth or uninterrupted surface of the enclosure 610. The tactile structure 634 may be a textured surface used to indicate the presence of input functionality along the enclosure 610 of the wearable audio device 600. In this regard, the touch-sensitive region 630 may be defined on the tactile structure 634; however, this is not required.

The sensor 628 may detect various physical manipulations of the tactile structure 634. For example, the sensor 628 may detect a first manipulation of the tactile structure 634, a second manipulation of the tactile structure 634, and so forth and provide signals to an associated processing unit corresponding to the different manipulations. For example, the first manipulation may be a finger moving on the tactile structure 634 in a first direction and the second manipulation may be a finger moving on the tactile structure 634 in a second, different direction. In other cases, the manipulations may be one or more of a squeeze, a roll, a press, a jog, and so on. In one sample embodiment, as described in greater detail below, the tactile structure 634 may be a portion of a stem or other feature of the wearable audio device 600, and the sensor 628 may detect a corresponding manipulation.

Figure 7:
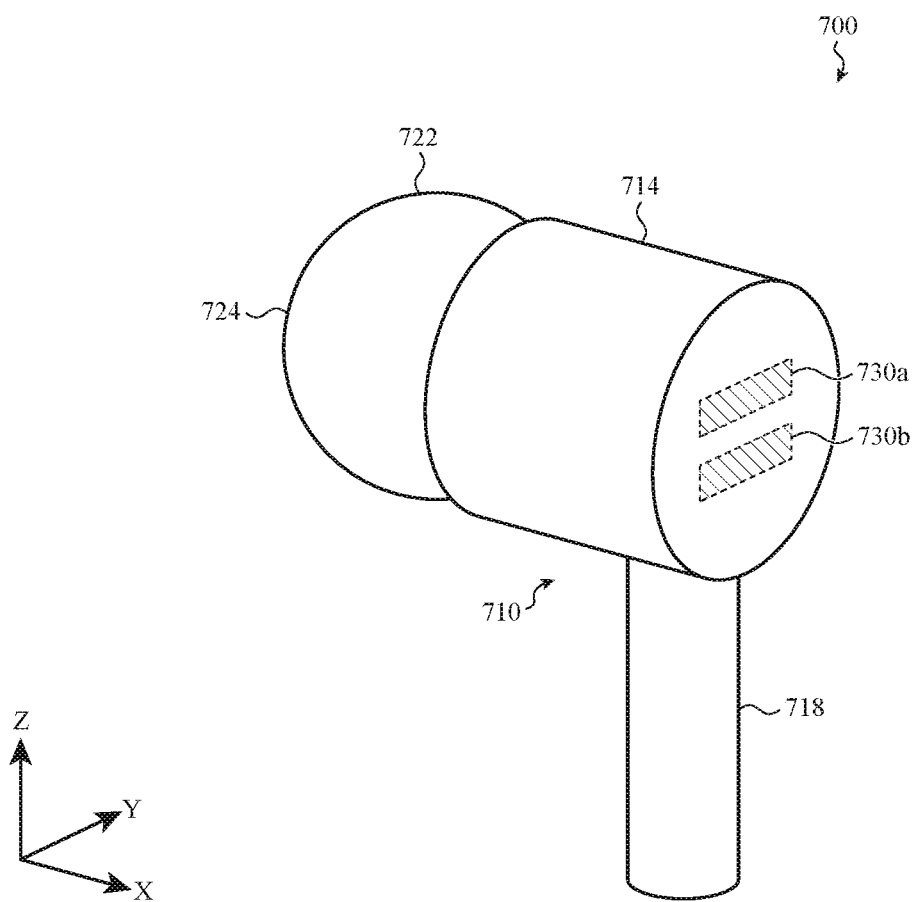
FIG. 7 depicts a sample wearable audio device having multiple input regions.

FIG. 7 depicts a wearable audio device 700. The wearable audio device 700 may be substantially analogous to other embodiments described herein. The wearable audio device 700 may therefore include similar components and/or perform similar functions of other wearable audio device described herein, including an enclosure 710, a main unit 714, a stem 718, a sealing component 722, and a conformable surface 724, redundant explanation of which is omitted here for clarity.

The wearable audio device 700 shown in FIG. 7 may include multiple touch-sensitive regions, such a first touch-sensitive region 730a and a second touch-sensitive region 730b. Each of the first touch-sensitive region 730a and the second touch-sensitive region 730b may be substantially analogous to the touch-sensitive region 630 described above with respect to FIGS. 6A and 6B. For example, each of the first touch-sensitive region 730a and the second touch-sensitive region 730 may be associated with one or more (or a common) sensor of the wearable audio device 700 that is configured to detect various gestures or manipulations performed along the enclosure 710. Redundant explanation of these components is omitted here for clarity.

The multiple touch-sensitive regions of FIG. 7 may be used to detect various different types of input that may be used to control different functions of the wearable audio device 700. For example, the first touch-sensitive region 730a may be associated with a first function of the wearable audio device 700 (e.g., such as a volume up function) and the second touch-sensitive region 730b may be associated with a second function of the wearable audio device 700 (e.g., such as a volume down function). The wearable audio device 700 may detect input at a particular touch-sensitive region and perform the associated function, thereby allowing the wearable audio device 700 to have multiple, distinct buttons defined on the surface. The functions may be programmable or otherwise customizable by the user, such that multiple different functions may be executed by the wearable audio device 700. This may be at least partially based on an operational context (such as that provided by the context module 175 of FIG. 1B), such as associating the touch-sensitive region with various different audio controls when the wearable audio device 700 is playing back an audio track, associating the touch-sensitive regions with various telecommunication controls when the wearable audio device 700 is handling a cellular call, and so on.

Figure 8:
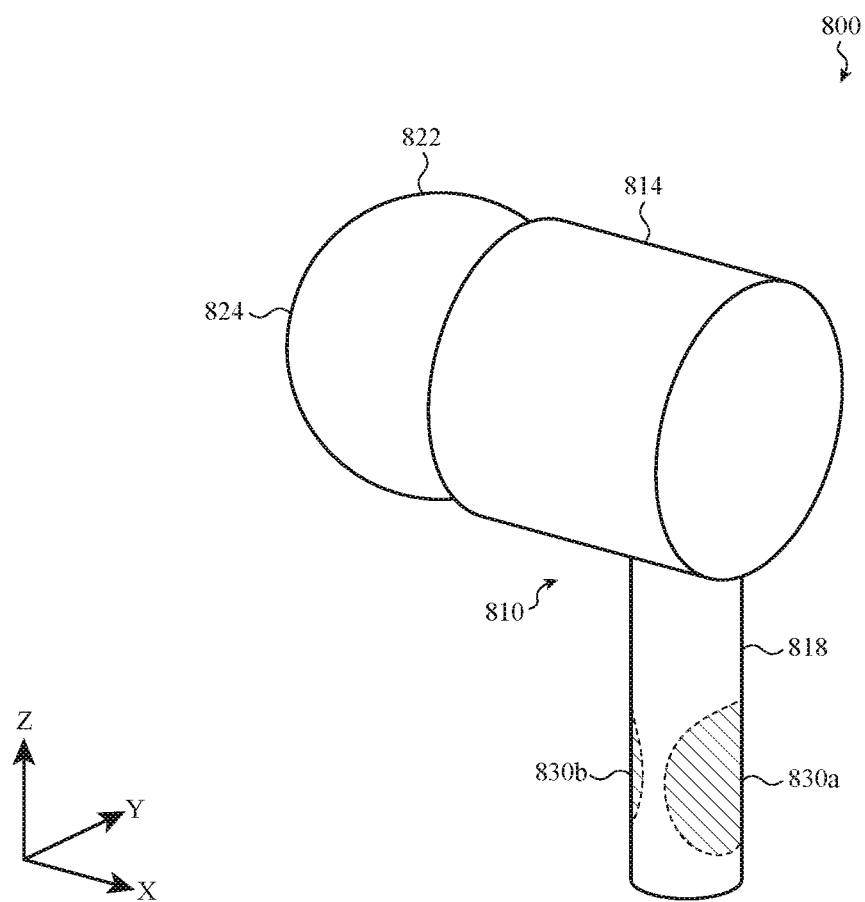
FIG. 8 depicts a sample wearable audio device having an input region on a stem.

While the first touch-sensitive region 730a and the second touch-sensitive region 730b are shown as being defined on a substantially smooth exterior surface of the main unit 714, it will be appreciated that the multiple touch-sensitive regions may be defined on substantially any exterior surface of the enclosure 710. Some embodiments include touch-sensitive regions on both the main unit 714 and the stem 718 and/or multiple touch-sensitive regions on the stem 718 (e.g., as shown in FIG. 8). Further, it will be appreciated that each of the first touch-sensitive region 730a and the second touch-sensitive region 730b may include distinct tactile features or structures, such as structures that each produce a distinct tactile output when contacted. As such, the distinct tactile outputs may indicate both the presence of input functionality along the enclosure 710 and the presence of distinct input functionalities as between the respective touch-sensitive regions.

FIG. 8 depicts a wearable audio device 800 that is substantially analogous to the wearable audio devices described herein, in some respects. The wearable audio device 800 may therefore include similar components and/or perform similar functions of other wearable audio devices described herein, including an enclosure 810, a main unit 814, a stem 818, a sealing component 822, and a conformable surface 824, redundant explanation of which is omitted here for clarity.

The wearable audio device 800 shown in FIG. 8 may include multiple touch-sensitive regions, such as a first touch-sensitive region 830a and a second touch-sensitive region 830b. Each of the first touch-sensitive region 830a and the second touch-sensitive region 830b may be substantially analogous to the touch-sensitive region 630 described above with respect to FIGS. 6A and 6B. For example, each of the first touch-sensitive region 830a and the second touch-sensitive region 830b may be associated with one or more (or a common) sensors of the wearable audio device 800 that are configured to detect various gestures or manipulations performed on the enclosure 810. Redundant explanation of these components is omitted here for clarity.

The multiple touch-sensitive regions of the wearable audio device 800 may be defined on a portion of the stem 818 of the enclosure 810. For example, as shown in FIG. 8, the first touch-sensitive region 830a may be defined on an end of the stem 818 and the second touch-second sensitive region 830b may be defined on the same end of the stem 818 opposite the first touch-sensitive region 830a.

The arrangement of the first touch-sensitive region 830a and the second touch-sensitive region 830b on the stem 818 may allow the stem 818 to receive various types of input. For example, the first touch-sensitive region 830a and the second touch-sensitive region 830b may cooperate to detect a squeeze, pinch, pull, press, and/or other manipulation of the stem 818. Continuing the example, the first touch-sensitive region 830a and the second touch-sensitive region 830b may each detect a touch that corresponds to a user contacting the stem 818 at the opposing sides. Upon a detection of the touch at each of the regions, a processing unit may control one or more functions of the wearable audio device 600, such as controlling an audio playback function, activate a voice command mode, and so on.

In some cases, the stem 818 may be or otherwise define a tactile structure. For example, the stem 818 may be a deformable structure that elastically bends, twists, and so on when contacted by a user. As such, the first touch-sensitive region 830a and the second touch-sensitive region 830b may cooperate to detect physical manipulations of the stem 818. This may include, in certain embodiments, a first manipulation of the stem (e.g., such as a twist of the stem 818 in a first direction), a second manipulation of the stem (e.g., such as a twist of the stem 818 in a second, opposing direction), among various other types of physical manipulations.

FIG. 9 depicts a wearable audio device 900 that may be substantially analogous in some respects to the wearable audio devices described herein. The wearable audio device 900 may therefore include similar components and/or perform similar functions of other wearable audio devices described herein, including an enclosure 910, a main unit 914, a stem 918, a sealing component 922, and a conformable surface 924, redundant explanation of which is omitted here for clarity.

The wearable audio device 900 shown in FIG. 9 may include one or more tactile structures positioned along an exterior of the enclosure 910, such as tactile structure 940. Tactile structure 940 may be a component of a mechanical switch or button that is configured to detect various types of input. For example, the tactile structure 940 may be a collapsible dome that buckles when pressed by a user. The collapsible dome may be a multi-input device, such that different signals are provided as a user presses into the dome (e.g., a first signal for a first manipulation or press of the dome, and a second signal for a second manipulation or press of the dome, and so on). In this regard, the tactile structure 940 may provide haptic feedback in response to the first manipulation and/or the second manipulation and close a corresponding switch or otherwise provide a signal corresponding to the respective manipulation. A processing unit may receive the provided signals and control a corresponding function of the wearable audio device 900, such as controlling an audio output of the wearable audio device 900.

Figure 10:
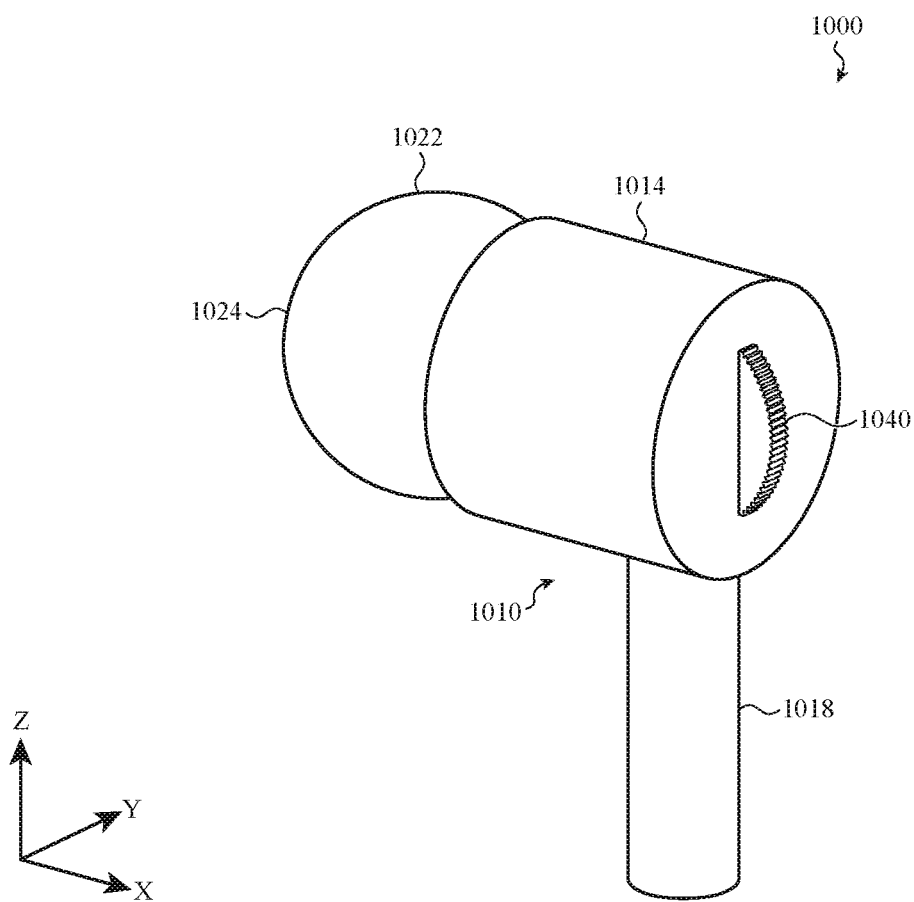
FIG. 10 depicts a sample wearable audio device having a rotary wheel.

FIG. 10 depicts a wearable audio device 1000. The wearable audio device 1000 may be substantially analogous to the wearable audio devices described herein. The wearable audio device 1000 may therefore include similar components and/or perform similar functions of other wearable audio devices described herein, including an enclosure 1010, a main unit 1014, a stem 1018, a sealing component 1022, and a conformable surface 1024, redundant explanation of which is omitted here for clarity.

The wearable audio device 1000 may include one or more tactile structures positioned along an exterior of the enclosure 1010, such as the tactile structure 1040. The tactile structure 1040 may be a component of a mechanical switch or button that is configured to detect various types of input. For example, the tactile structure 1040 may be a wheel that rotates when manipulated by a user. As shown in FIG. 10, the wheel may be positioned on or extend through a surface of the main unit 1014; however, in other embodiments, the wheel may be positioned on other surfaces, including on a surface of the stem 1018. The wheel may be a multi-input device, such that various different signals are provided as a user causes the wheel to rotate (e.g., a first signal for a first rotation of the wheel and a second signal for a second rotation of the wheel, and so on). A processing unit may receive the provided signals and control a corresponding function of the wearable audio device 1000, such as controlling an audio output of the wearable audio device 1000.

Rotation may be detected using various techniques, such as using one or more of the input devices 110 described above with respect to FIG. 1A. For example, one or more optical sensors positioned within the wearable audio device 1000 may detect rotation of the wheel using reflected light. In other cases, mechanical devices may be used, which may detect the rotation of the wheel using electrical, magnetic, or physical contacts disposed within the wearable audio device 1000. The tactile structure 1040 may also provide haptic feedback in response to the rotation. This may be a resistive force that opposes rotational input. Additionally or alternatively, the tactile structure 1040 may produce an audible click.

Figure 11:
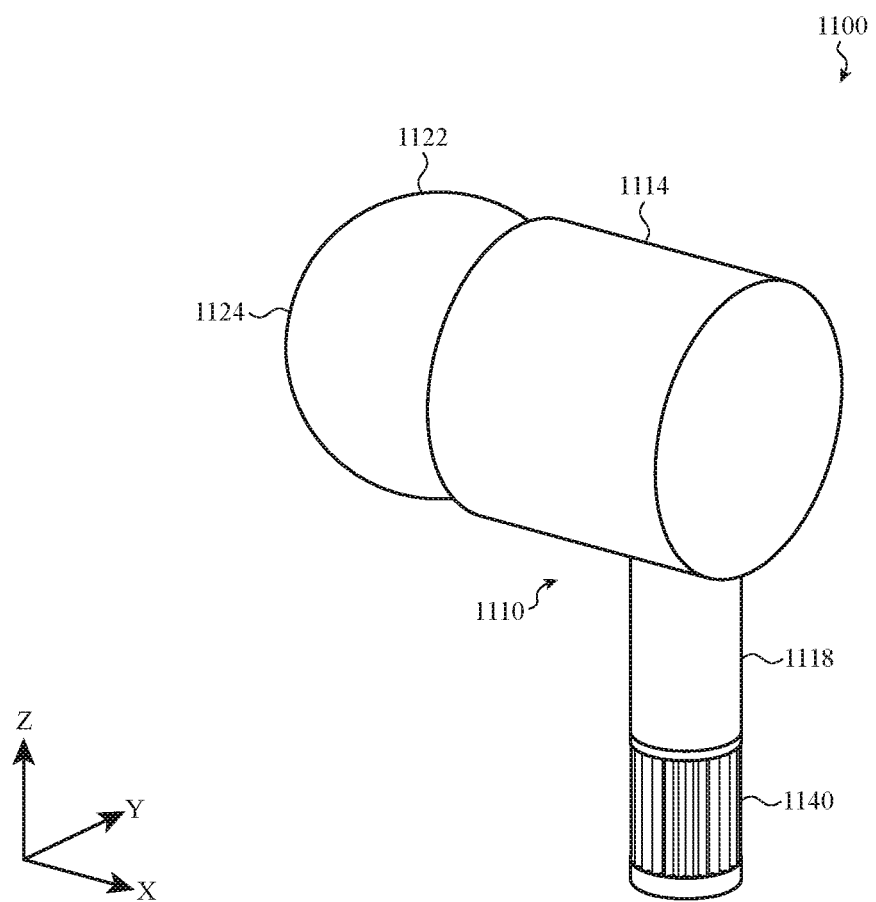
FIG. 11 depicts a sample wearable audio device having a stem with a rotatable portion.

FIG. 11 depicts a wearable audio device 1100. The wearable audio device 1100 may be substantially analogous to the wearable audio devices described herein. The wearable audio device 1100 may therefore include similar components and/or perform similar functions of other wearable audio device described herein, including an enclosure 1110, a main unit 1114, a stem 1118, a sealing component 1122, and a conformable surface 1124, redundant explanation of which is omitted here for clarity.

The wearable audio device 1100 shown in FIG. 11 may include one or more tactile structures positioned along an exterior of the enclosure 1110, such as the tactile structure 1140. The tactile structure 1140 may be a component of a mechanical switch or button that is configured to detect various types of input. For example, the tactile structure 1140 may be a rotatable portion of the stem 1118 that is configured to rotate when manipulated by a user. As shown in FIG. 11, the rotatable portion may be positioned on an end of the stem 1118; however, in other embodiments, the rotatable portion may be positioned on other surfaces or features, including features of the main unit 1114. The rotatable portion may be a multi-input device, such that various different signals are provided as a user causes the rotatable portion to rotate (e.g., a first signal for a first rotation of the rotatable portion and a second signal for a second rotation of the rotatable portion, and so on). A processing unit may receive the provided signals and control a corresponding function of the wearable audio device 1100, such as controlling an audio output of the wearable audio device 1100.

The rotation may be detected using various techniques, using one or more of the input devices 110 described above with respect to FIG. 1A. For example, one or more optical sensors positioned within the wearable audio device 1100 may detect rotation of the rotatable portion using reflected light. In other cases, mechanical rotary detection devices may be used, which may detect the rotation of the rotatable portion using electrical contacts disposed within the wearable audio device 1100. The tactile structure 1140 may also be configured to provide haptic feedback in response to the rotation. This may be a resistive force that opposes rotational input. Additionally or alternatively, the tactile structure 1040 may produce an audible click.

Figure 12:
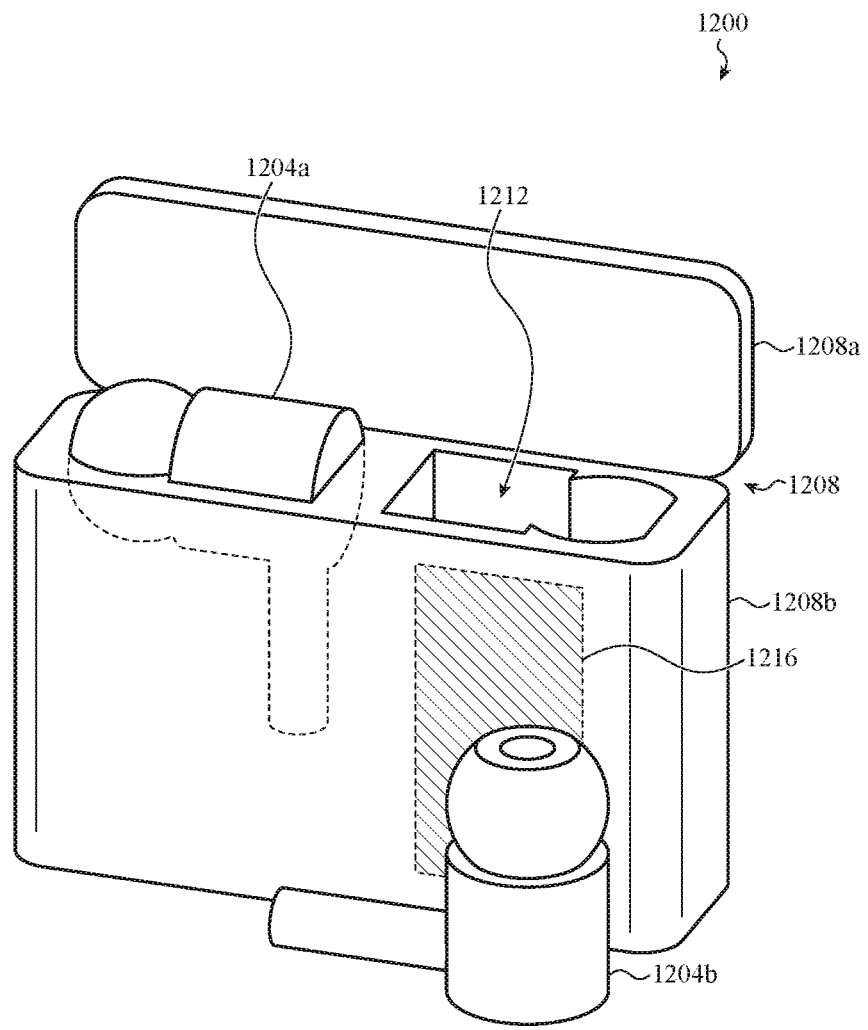
FIG. 12 depicts a sample wearable audio device and a case.

FIG. 12 depicts an example case 1200. The case 1200 may generally be configured to receive one or more wearable audio devices, such as the first wearable audio device 1204a and the second wearable audio device 1204b shown in FIG. 12. In this regard, the case 1200 may be used to store and protect the first wearable audio device 1204a and the second wearable audio device 1204b when not in use.

For purposes of illustration, the case 1200 is shown as having an enclosure 1208. The enclosure 1208 includes an upper portion 1208a and a lower portion 1208b. The upper portion 1208a may pivot relative to the lower portion 1208b, which may open the case 1200. Defined within a least the lower portion 1208b may be one or more receiving features 1212. The receiving feature 1212 may be configured to receive respective ones of the first wearable audio device 1204a and the second wearable audio device 1204b. For example, in some embodiments, the receiving features 1212 may be contoured to a matching shape of the audio devices, which may allow the devices to be supported or snuggly received within the enclosure 1208. The receiving features 1212 may also include various electrical connectors, terminals, adaptors, and so on that may electrically recharge wearable audio devices that are received by the receiving features 1212.

The case 1200 may also function as a companion device to the wearable audio devices described herein, such as the first wearable audio device 1204a and/or the second wearable audio device 1204b shown in FIG. 12. In this regard, the case 1200 may include a processing unit and may therefore perform similar functions to the companion devices described herein, such as the companion device 170 of FIG. 1B. Redundant explanation of these functions is omitted here for clarity.

In the embodiment of FIG. 12, the case 1200 may be configured to detect input, such as a gesture performed along an exterior of the enclosure 1208. For example, as shown in FIG. 12, the lower portion 1208b may include a touch-sensitive region 1216. One or more sensors, such as substantially any of the sensors of the input device 110 of FIG. 1A, may be positioned within the enclosure 1208 and configured to detect the input at the touch-sensitive region 1216. In some cases, the touch-sensitive region 1216 may be defined at a tactile structure or textured surface of the enclosure 1208 and the sensors within the case may be configured to detect various manipulations of the tactile structure. The sensor may detect the gesture, manipulation, or other input and provide a corresponding signal to, for example, a processing unit of the case 1200 and/or the wearable audio devices 1204a, 1204b. The processing unit may receive the provided signals and control a corresponding function of the wearable audio devices 1204a, 1204b, such as controlling an audio output of the wearable audio devices 1204a, 1204b, among other functions.

Figure 13:
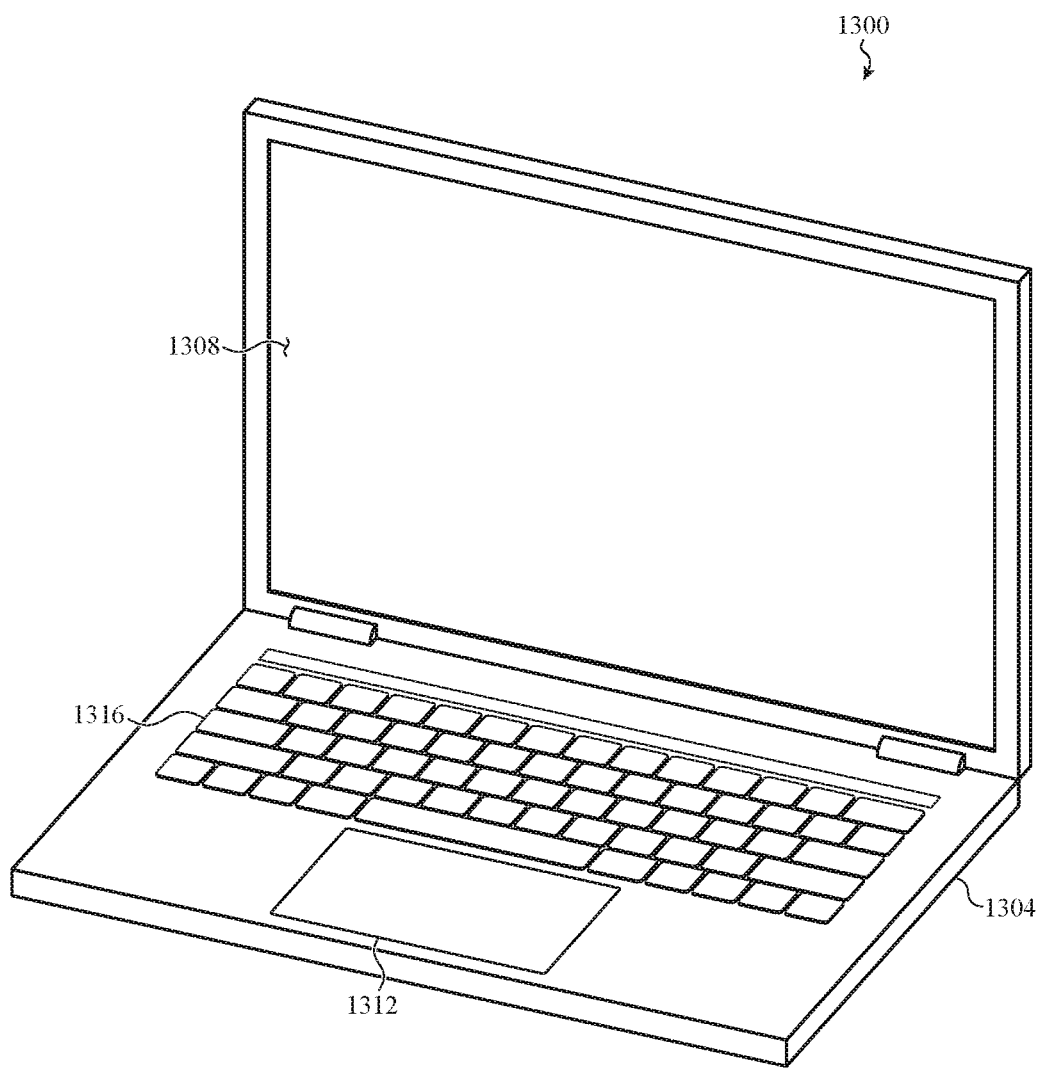
FIG. 13 depicts a sample notebook computer.

FIG. 13 depicts an example electronic device 1300. The electronic device 1300 may be or function as a companion device to the wearable audio devices described herein. The electronic device 1300 may therefore perform similar functions to the companion devices described herein, such as the companion device 170 of FIG. 1B. Redundant explanation of these functions is omitted here for clarity.

For purposes of illustration, the electronic device 1300 is a notebook computer. In this regard, the electronic device 1300 is shown in FIG. 13 as having an enclosure 1304, a display 1308, one or more input/output members 1312, and a keyboard assembly 1316. It should be noted that the electronic device 1300 may also include various other components, such as one or more ports (e.g., charging ports, data transfer ports, or the like), additional input/output buttons, and so on. As such, the discussion of any electronic device, such as electronic device 1300, or other companion devices, is meant as illustrative only.

Figure 14:
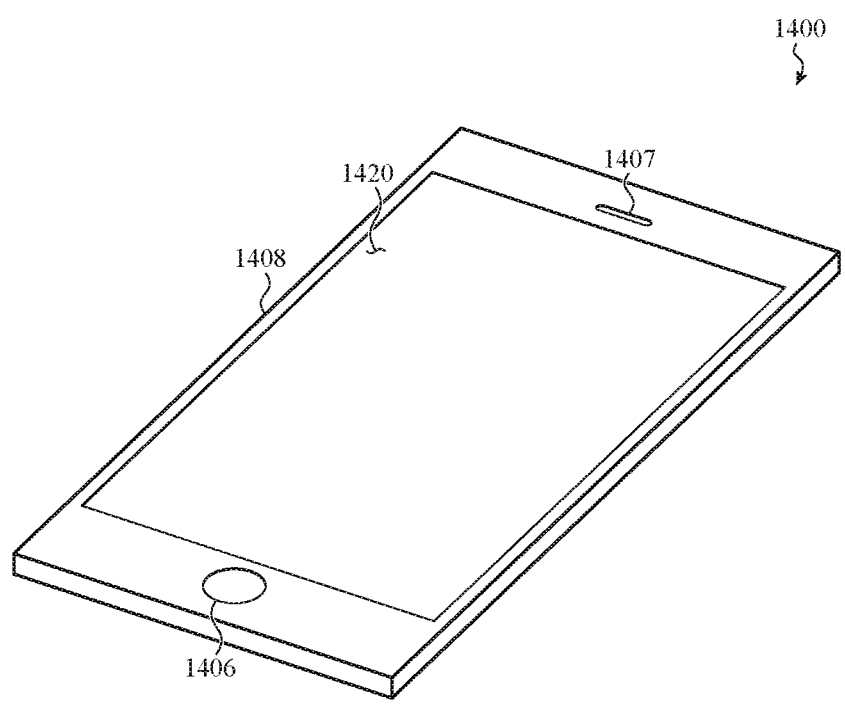
FIG. 14 depicts a sample portable device.

FIG. 14 depicts an example electronic device 1400. The electronic device 1400 may be or function as a companion device to the wearable audio devices described herein. The electronic device 1400 may therefore perform similar functions to the companion devices described herein, such as the companion device 170 of FIG. 1B. Redundant explanation of these functions is omitted here for clarity.

For purposes of illustration, the electronic device 1400 is a mobile phone. In this regard, the electronic device 1400 is shown in FIG. 14 as having an enclosure 1408, a touch-sensitive display 1420, one or more input/output members 1406, and a speaker 1407. It should be noted that the electronic device may also include various other components, such as one or more ports (e.g., charging ports, data transfer ports, or the like), additional input/output buttons, and so on. As such, the discussion of any electronic device, such as electronic device 1400 is meant as illustrative only.

Figure 15:
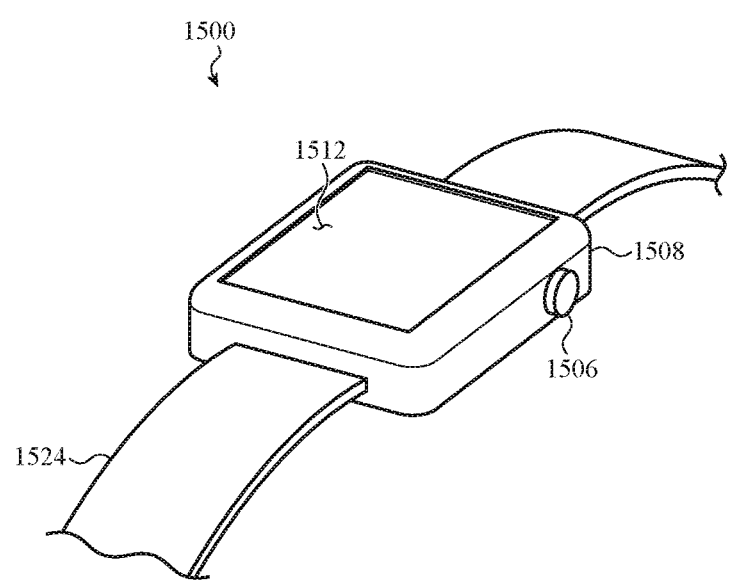
FIG. 15 depicts a sample watch.

FIG. 15 depicts an example electronic device 1500. The electronic device 1500 may be or function as a companion device to the wearable audio devices described herein. The electronic device 1500 may therefore perform similar functions to the companion devices described herein, such as the companion device 170 of FIG. 1B. Redundant explanation of these functions is omitted here for clarity.

For purposes of illustration, the electronic device 1500 is a watch or other wearable electronic device. In this regard, the electronic device 1500 is shown in FIG. 15 as having an enclosure 1508, a crown 1506, a touch-sensitive display 1512, and a band 1524. The touch-sensitive display 1512 may be positioned in a first opening defined by the enclosure 1508 and the crown 1506 may be at least partially positioned in a second opening defined by the enclosure 1508. The touch-sensitive display 1512 may be responsive to translational and rotational movement of the crown 1506. For example, a visual output of the touch-sensitive display 1512 may be modified in a first manner in response to rotational movement of the crown 1506 and in a second manner in response to translational movement of the crown 1506. It should be noted that the electronic device 1500 may also include various other components, such as one or more ports (e.g., charging ports, data transfer ports, or the like), additional input/output buttons, and so on. As such, the discussion of any electronic device, such as electronic device 1500, is meant as illustrative only.

Figure 16:
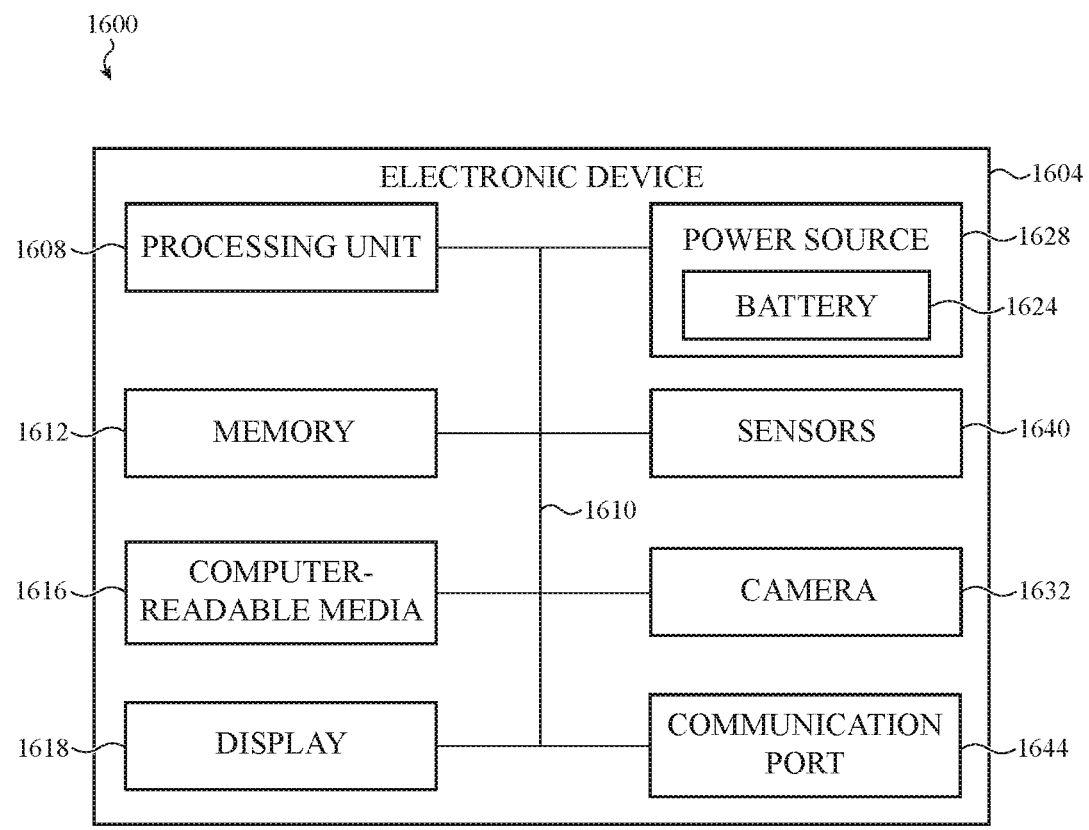
FIG. 16 depicts a functional block diagram of an electronic device.

FIG. 16 is a functional block diagram 1600 of a sample electronic device 1604. It will be appreciated, however, that the functional block diagram described herein of the electronic device 1604 may include components representative of substantially any other electronic devices, wearable audio devices, companion devices, or the like described herein. In this regard, the schematic representation in FIG. 16 may correspond to the electronic device 1604. However, the schematic representation in FIG. 16 may also represent the other electronic devices, audio devices, companion devices, or the like described herein, for example, such as the wearable audio device 100 of FIG. 1A and companion device 170 of FIG. 1B. The electronic device 1604 may include any appropriate hardware (e.g., computing devices, data centers, switches), software (e.g., applications, system programs, engines), network components (e.g., communication paths, interfaces, routers), and the like (not necessarily shown in the interest of clarity) for use in facilitating any appropriate operations disclosed herein.

As shown in FIG. 16, the electronic device 1604 may include a processing unit or element 1608 operatively connected to computer memory 1612 and computer-readable media 1616. The processing unit 1608 may be operatively connected to the memory 1612 and computer-readable media 1616 components via an electronic bus or bridge (e.g., such as system bus 1610). The processing unit 1608 may include one or more computer processors or microcontrollers that are configured to perform operations in response to computer-readable instructions. The processing unit 1608 may be a central processing unit of the stylus. Additionally or alternatively, the processing unit 1608 may be other processors within the device including application specific integrated chips (ASIC) and other microcontroller devices.

The memory 1612 may include a variety of types of non-transitory computer-readable storage media, including, for example, read access memory (RAM), read-only memory (ROM), erasable programmable memory (e.g., EPROM and EEPROM), or flash memory. The memory 1612 is configured to store computer-readable instructions, sensor values, and other persistent software elements. Computer-readable media 1616 may also include a variety of types of non-transitory computer-readable storage media, including, for example, a hard-drive storage device, a solid-state storage device, a portable magnetic storage device, or other similar device. The computer-readable media 1616 may also be configured to store computer-readable instructions, sensor values, and other persistent software elements.

In this example, the processing unit 1608 is operable to read computer-readable instructions stored on the memory 1612 and/or computer-readable media 1616. The computer-readable instructions may adapt the processing unit 1608 to perform the operations or functions described above with respect to FIGS. 1A-15. The computer-readable instructions may be provided as a computer-program product, software application, or the like. It should be appreciated that, where the electronic device is a stylus, the processing unit 1608 may be located in an electronic device associated with the stylus, rather than the stylus itself. In such embodiments, data may be transmitted from the stylus to and from the electronic device, such that the processing unit in the electronic device may operatively control the stylus.

As shown in FIG. 16, the electronic device 1604 may also include a display 1618. The display 1618 may include a liquid-crystal display (LCD), organic light emitting diode (OLED) display, light emitting diode (LED) display, or the like. If the display 1618 is an LCD, the display may also include a backlight component that can be controlled to provide variable levels of display brightness. If the display 1618 is an OLED or LED type display, the brightness of the display 1618 may be controlled by modifying the electrical signals that are provided to display elements.

The electronic device 1604 may also include a battery 1624 that is configured to provide electrical power to the components of the electronic device 1604. The battery 1624 may include one or more power storage cells that are linked together to provide an internal supply of electrical power. In this regard, the battery 1624 may be a component of a power source 1628 (e.g., including a charging system or other circuitry that supplies electrical power to components of the electronic device 1604). The battery 1624 may be operatively coupled to power management circuitry that is configured to provide appropriate voltage and power levels for individual components or groups of components within the electronic device 1604. The battery 1624, via power management circuitry, may be configured to receive power from an external source, such as an AC power outlet or interconnected computing device. The battery 1624 may store received power so that the electronic device 1604 may operate without connection to an external power source for an extended period of time, which may range from several hours to several days.

The electronic device 1604 may also include one or more sensors 1640 that may be used to detect a touch and/or force input, environmental condition, orientation, position, or some other aspect of the electronic device 1604. For example, sensors 1640 that may be included in the electronic device 1604 may include, without limitation, one or more accelerometers, gyrometers, inclinometers, or magnetometers. The sensors 1640 may also include one or more proximity sensors, such as a magnetic hall-effect sensor, inductive sensor, capacitive sensor, continuity sensor, or the like.

The sensors 1640 may also be broadly defined to include wireless positioning devices including, without limitation, global positioning system (GPS) circuitry, Wi-Fi circuitry, cellular communication circuitry, and the like. The electronic device 1604 may also include one or more optical sensors, including, without limitation, photodetectors, photosensors, image sensors, infrared sensors, or the like. In one example, the sensor 1640 may be an image sensor that detects a degree to which an ambient image matches a stored image. As such, the sensor 1640 may be used to identify a user of the electronic device 1604. The sensors 1640 may also include one or more acoustic elements, such as a microphone used alone or in combination with a speaker element. The sensors 1640 may also include a temperature sensor, barometer, pressure sensor, altimeter, moisture sensor or other similar environmental sensor. The sensors 1640 may also include a light sensor that detects an ambient light condition of the electronic device 1604.

The sensor 1640, either alone or in combination, may generally be a motion sensor that is configured to estimate an orientation, position, and/or movement of the electronic device 1604. For example, the sensor 1640 may include one or more motion sensors, including, for example, one or more accelerometers, gyrometers, magnetometers, optical sensors, or the like to detect motion. The sensors 1640 may also be configured to estimate one or more environmental conditions, such as temperature, air pressure, humidity, and so on. The sensors 1640, either alone or in combination with other input, may be configured to estimate a property of a supporting surface, including, without limitation, a material property, surface property, friction property, or the like.

The electronic device 1604 may also include a camera 1632 that is configured to capture a digital image or other optical data. The camera 1632 may include a charge-coupled device, complementary metal oxide (CMOS) device, or other device configured to convert light into electrical signals. The camera 1632 may also include one or more light sources, such as a strobe, flash, or other light-emitting device. As discussed above, the camera 1632 may be generally categorized as a sensor for detecting optical conditions and/or objects in the proximity of the electronic device 1604. However, the camera 1632 may also be used to create photorealistic images that may be stored in an electronic format, such as JPG, GIF, TIFF, PNG, raw image file, or other similar file types.

The electronic device 1604 may also include a communication port 1644 that is configured to transmit and/or receive signals or electrical communication from an external or separate device. The communication port 1644 may be configured to couple to an external device via a cable, adaptor, or other type of electrical connector. In some embodiments, the communication port 1644 may be used to couple the electronic device 1604 with a computing device and/or other appropriate accessories configured to send and/or receive electrical signals. The communication port 1644 may be configured to receive identifying information from an external accessory, which may be used to determine a mounting or support configuration. For example, the communication port 1644 may be used to determine that the electronic device 1604 is coupled to a mounting accessory, such as a particular type of stand or support structure.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A wearable audio device comprising:
an enclosure defining an opening, an interior volume, and an exterior surface;
a sealing component coupled to the enclosure and configured to form a sealed passage from the opening to an ear of a user;
a speaker positioned within the interior volume and acoustically coupled to the opening;
a touch sensor configured to detect:
a first gesture input applied to the exterior surface, the first gesture input having a first movement direction along the exterior surface; and
a second gesture input applied to the exterior surface, the second gesture input having a second movement direction along the exterior surface, the second movement direction different from the first movement direction; and
a processing unit positioned within the interior volume and operatively coupled to the touch sensor and the speaker and configured to:
cause the speaker to provide an audio output;
cause the speaker to alter the audio output in response to the first gesture input; and
cause the speaker to alter the audio output in response to the second gesture input.

2. The wearable audio device of claim 1, wherein:
altering the audio output in response to the first gesture input comprises increasing a volume of the audio output; and
altering the audio output in response to the second gesture input comprises decreasing the volume of the audio output.

3. The wearable audio device of claim 1, wherein the first movement direction is opposite the second movement direction.

4. The wearable audio device of claim 1, wherein:
the enclosure comprises:
a body; and
a stem extending from the body and defining at least a portion of the exterior surface;
the speaker is positioned at least partially in the body; and
the touch sensor is configured to detect gesture inputs applied to the stem.

5. The wearable audio device of claim 4, wherein each of the first gesture input and the second gesture input are applied to the stem.

6. The wearable audio device of claim 1, wherein:
the wearable audio device further comprises a microphone positioned in the enclosure and configured to detect an audio input; and
the processing unit is further configured to alter the audio output in response to the audio input.

7. The wearable audio device of claim 6, wherein:
the enclosure comprises:
a body; and
a stem extending from the body; and
the microphone is positioned in the stem.

8. A wearable audio device comprising:
an enclosure defining an exterior surface and a touch-sensitive region along the exterior surface;
a speaker at least partially within the enclosure and configured to produce an audio output;
a compliant member coupled to the enclosure and configured to retain the wearable audio device in a user's ear;
a sensing system configured to detect:
a first gesture input applied within the touch-sensitive region and having a first motion direction; and
a second gesture input applied within the touch-sensitive region and having a second motion direction, different from the first motion direction; and
a processing unit at least partially within the enclosure and configured to alter the audio output based at least in part on detection of at least one of the first gesture input or the second gesture input.

9. The wearable audio device of claim 8, wherein the enclosure is configured such that the exterior surface is positioned outside of the user's ear when the wearable audio device is being worn.

10. The wearable audio device of claim 8, wherein the processing unit is configured to:
alter the audio output in a first manner in response to the first gesture input; and
alter the audio output in a second manner, different from the first manner, in response to the second gesture input.

11. The wearable audio device of claim 10, wherein:
altering the audio output in the first manner comprises increasing a volume; and
altering the audio output in the second manner comprises decreasing the volume.

12. The wearable audio device of claim 8, wherein:
the compliant member is coupled to a first side of the enclosure; and
the touch-sensitive region is positioned along a second side of the enclosure opposite the first side.

13. The wearable audio device of claim 8, wherein:
the enclosure comprises:
a body; and
a stem extending from the body; and
the wearable audio device further comprises a microphone positioned in the stem and configured to receive an audio input.

14. The wearable audio device of claim 13, wherein the processing unit is further configured to alter the audio output in response to the audio input.

15. A wearable device comprising:
an enclosure;
a speaker within the enclosure;

an earpiece portion extending from the enclosure and defining an acoustic passage for audio output from the speaker;

a touch sensing system at least partially within the enclosure and defining a touch sensitive region along an exterior surface of the enclosure, the touch sensing system configured to detect:
- a first gesture within the touch sensitive region and having a first direction;
- a second gesture within the touch sensitive region and having second direction, different from the first direction; and a processing unit at least partially within the enclosure and configured to:
- alter the audio output in a first manner in response to detecting the first gesture; and
- alter the audio output in a second manner, different from the first manner, in response to detecting the second gesture.

16. The wearable device of claim 15, wherein the touch sensitive region has a first surface texture that is distinct from a second surface texture of a surrounding surface of the enclosure.

17. The wearable device of claim 15, wherein altering the audio output in the first manner comprises increasing a volume of the audio output, and altering the audio output in the second manner comprises decreasing the volume of the audio output.

18. The wearable device of claim 15, wherein:
the wearable device further comprises a microphone at least partially within the enclosure and configured to receive an audio input; and
the processing unit is further configured to alter the audio output in response to the audio input.

19. The wearable device of claim 18, wherein:
the microphone is a first microphone; and
the wearable device further comprises a second microphone at least partially within the enclosure and configured to detect ambient noise.

20. The wearable device of claim 19, wherein the processing unit is further configured to acoustically cancel the ambient noise from the audio output.

* * * * *